US012708491B2

(12) United States Patent
Garner et al.

(10) Patent No.: US 12,708,491 B2
(45) Date of Patent: Aug. 18, 2026

(54) ORAL APPLIANCE

(71) Applicant: Dental Choice Holdings LLC, Louisville, KY (US)

(72) Inventors: Dena P. Garner, Isle of Palms, SC (US); Robert C. Molhoek, Edna, MN (US)

(73) Assignee: Dental Choice Holdings LLC, Louisville, KY (US)

(*) Notice: Subject to any disclaimer, the term of this patent is extended or adjusted under 35 U.S.C. 154(b) by 121 days.

(21) Appl. No.: 18/775,440

(22) Filed: Jul. 17, 2024

(65) Prior Publication Data

US 2024/0374352 A1 Nov. 14, 2024

Related U.S. Application Data

(63) Continuation-in-part of application No. 17/580,835, filed on Jan. 21, 2022.

(51) Int. Cl.
*A61C 7/08* (2006.01)

(52) U.S. Cl.
CPC .................................... *A61C 7/08* (2013.01)

(58) Field of Classification Search
CPC ....... A61F 5/56–566; A61C 7/08; A61C 7/36; A63B 71/085; A63B 2071/086; A63B 2071/088; Y10S 602/902; A61B 90/16
See application file for complete search history.

(56) References Cited

U.S. PATENT DOCUMENTS 2,659,366 A 11/1953 Savarese
3,124,129 A 3/1964 Grossberg
3,496,936 A 2/1970 Gores
3,924,638 A 12/1975 Mann
4,519,386 A 5/1985 Sullivan
4,955,393 A 9/1990 Adell
5,052,409 A 10/1991 Tepper
5,194,003 A 3/1993 Garay et al.
5,316,020 A 5/1994 Truffer
5,406,963 A 4/1995 Adell
5,536,168 A 7/1996 Bourke
5,584,687 A 12/1996 Sullivan et al.
5,718,575 A 2/1998 Cross, III
5,752,822 A 5/1998 Robson
(Continued)

FOREIGN PATENT DOCUMENTS

CA 2668913 A1 5/2008
CN 102123678 B 7/2011
(Continued)

OTHER PUBLICATIONS

Moses D.D.S., Allen J.; Evolution of Theory on Oral Appliances and Exercises for Sleep Apnea and Snoring; Sleep Diagnosis and Therapy, vol. 5 No. 7, Nov.-Dec. 2010.
(Continued)

*Primary Examiner* — Alireza Nia
*Assistant Examiner* — Robin Han
(74) *Attorney, Agent, or Firm* — Dinsmore & Shohl LLP

(57) ABSTRACT

Present embodiments related to an oral appliance. More specifically, but without limitation, present embodiments relate to an oral appliance which improves aerobic performance when used during workouts or other athletic endeavors, and additionally while sleeping to improve post-workout recovery.

17 Claims, 12 Drawing Sheets

(56) References Cited

U.S. PATENT DOCUMENTS 5,865,619 A 2/1999 Cross, III et al.
5,879,155 A 3/1999 Kittlesen
6,012,919 A 1/2000 Cross, III et al.
6,092,524 A 7/2000 Barnes
6,196,840 B1 3/2001 Zentz et al.
6,237,601 B1 5/2001 Kittelsen et al.
6,241,518 B1 6/2001 Sullivan
6,257,239 B1 7/2001 Kittelsen et al.
6,371,758 B1 4/2002 Kittlesen
6,415,794 B1 7/2002 Kittelsen
6,467,484 B1 10/2002 De Voss
6,491,036 B2 12/2002 Cook
6,505,626 B2 1/2003 Kittelsen et al.
6,505,627 B2 1/2003 Kittelsen et al.
6,505,628 B2 1/2003 Kittelsen et al.
6,508,251 B2 1/2003 Kittelsen et al.
6,510,853 B1 1/2003 Kittelsen et al.
6,533,943 B1 3/2003 Jones et al.
6,539,943 B1 4/2003 Kittelsen
6,553,996 B2 4/2003 Kittelsen
6,581,604 B2 6/2003 Cook
6,588,430 B2 7/2003 Kittelsen et al.
6,598,365 B2 7/2003 Abraham et al.
6,598,605 B1 7/2003 Kittlesen et al.
6,626,180 B1 9/2003 Kittelsen et al.
6,675,806 B2 1/2004 Kittelsen et al.
6,675,807 B2 1/2004 Kittelsen et al.
6,691,710 B2 2/2004 Kittelsen et al.
D496,154 S 9/2004 Herman et al.
D496,498 S 9/2004 Kittelsen et al.
D496,499 S 9/2004 Kittelsen
6,820,623 B2 11/2004 Cook
6,830,051 B1 12/2004 Lesniak
D500,897 S 1/2005 Herman
D500,898 S 1/2005 Herman
D501,062 S 1/2005 Herman
6,837,246 B1 1/2005 DeLuke
D502,995 S 3/2005 Cook
6,941,952 B1 9/2005 Rush, III
7,059,332 B2 6/2006 Eli
7,299,804 B2 11/2007 Kittelsen et al.
D570,724 S 6/2008 Kittelsen
D586,252 S 2/2009 Kittelsen
7,549,423 B1 6/2009 Hirshberg
7,798,149 B2 9/2010 Haduong
7,890,193 B2 2/2011 Tingey
7,950,394 B2 5/2011 Elkin et al.
D641,478 S 7/2011 Belvedere
7,975,701 B2 7/2011 Bergersen
8,074,658 B2 12/2011 Kittelsen et al.
8,075,309 B2 12/2011 Li et al.
8,113,206 B2 2/2012 Roettger
8,474,462 B2 7/2013 Makower
8,567,408 B2 10/2013 Roettger
8,667,972 B2 3/2014 Makkar et al.
8,689,797 B2 4/2014 Elkin et al.
8,839,795 B2 9/2014 Von Arx
9,022,903 B2 5/2015 Rafih et al.
9,138,376 B2 9/2015 Allen
D743,108 S 11/2015 Charlton
D743,109 S 11/2015 Charlton
9,668,827 B2 6/2017 Roettger
9,968,419 B2 5/2018 Alvarez et al.
10,328,225 B2 6/2019 Garner
11,083,956 B1 8/2021 Varga
11,129,746 B2 9/2021 Alvarez et al.
11,260,189 B2 3/2022 Garner
11,266,802 B2 3/2022 Garner
11,285,035 B2 3/2022 Alvarez et al.
2002/0066454 A1 6/2002 Kittelsen et al.
2002/0114694 A1 8/2002 Teplanszky
2002/0144687 A1 10/2002 Kittelsen et al.
2002/0144688 A1 10/2002 Kittelsen et al.
2002/0144689 A1 10/2002 Kittelsen et al.
2002/0144690 A1 10/2002 Kittelsen et al.
2002/0144691 A1 10/2002 Kittelsen et al.
2002/0144692 A1 10/2002 Kittelsen et al.
2002/0144693 A1 10/2002 Kittelsen et al.
2002/0144695 A1 10/2002 Cook
2002/0192617 A1 12/2002 Phan
2003/0040679 A1 2/2003 Weber et al.
2003/0101999 A1 6/2003 Kittelsen
2004/0094165 A1 5/2004 Cook
2004/0107970 A1 6/2004 Kittelsen et al.
2004/0181166 A1 9/2004 Williford et al.
2004/0250817 A1 12/2004 Kittelsen et al.
2005/0115571 A1 6/2005 Jacobs
2005/0241646 A1 11/2005 Sotos et al.
2005/0284489 A1 12/2005 Ambis
2006/0078840 A1 4/2006 Robson
2006/0289013 A1 12/2006 Keropian
2007/0261701 A1 11/2007 Sanders
2007/0289600 A1 12/2007 Li
2008/0099029 A1 5/2008 Lamberg
2008/0138755 A1 6/2008 Jansheski
2008/0210244 A1 9/2008 Keropian
2009/0126742 A1 5/2009 Summer
2009/0130635 A1 5/2009 Tortorici
2009/0191502 A1 7/2009 Cao et al.
2009/0221884 A1 9/2009 Ryan
2009/0308403 A1 12/2009 Roettger et al.
2010/0147315 A1 6/2010 Chodorow
2010/0252053 A1 10/2010 Garner et al.
2010/0269836 A1 10/2010 Roettger et al.
2011/0017221 A1 1/2011 Garner et al.
2011/0039223 A1 2/2011 Li
2011/0067710 A1 3/2011 Jansheski
2011/0114100 A1 5/2011 Ramiro et al.
2012/0090625 A1 4/2012 Evans et al.
2012/0165862 A1 6/2012 Allen
2012/0305008 A1 12/2012 Garner et al.
2012/0325224 A1 12/2012 Elkin
2013/0042876 A1 2/2013 Hermanson
2013/0066236 A1 3/2013 Herman
2013/0068237 A1 3/2013 Herman
2013/0074851 A1 3/2013 Herman
2013/0081640 A1 4/2013 Herman
2013/0298916 A1 11/2013 Alvarez
2014/0026896 A1 1/2014 Roettger et al.
2014/0080083 A1 3/2014 Mathieu
2014/0090652 A1 4/2014 Hakimi
2014/0135868 A1 5/2014 Bashyam
2014/0272761 A1 9/2014 Lowe
2015/0079530 A1 3/2015 Bergersen
2015/0272773 A1 10/2015 Rico
2015/0366636 A1 12/2015 Zampino
2016/0158628 A1 6/2016 Layzell
2016/0230007 A1 8/2016 Johnson
2016/0367342 A1 12/2016 Alvarez
2017/0020716 A1 1/2017 Hart et al.
2018/0207022 A1 7/2018 Alvarez et al.
2018/0344508 A1* 12/2018 Brown .................... A61F 5/566
2018/0353838 A1 12/2018 Padavan
2019/0262565 A1 8/2019 Garner
2019/0374734 A1 12/2019 Garner
2020/0261187 A1 8/2020 Simonetti
2020/0261255 A1* 8/2020 Huang ................. A63B 71/085
2022/0008244 A1* 1/2022 Hart ........................ A61F 5/566
2022/0087854 A1 3/2022 Knutzen
2022/0096767 A1 3/2022 Garner
2023/0233923 A1 7/2023 Garner
2024/0374352 A1 11/2024 Garner

FOREIGN PATENT DOCUMENTS

DE 29509294 5/1995
DE 102004009883 9/2005
FR 2872406 3/2007
GB 2444588 3/2009
GB 2513902 A 11/2014
JP 2006519656 A 8/2006
JP 2011512177 A 4/2011
JP 2011514185 A 5/2011
JP 5008394 B2 8/2012

(56) References Cited

FOREIGN PATENT DOCUMENTS

| | | |
|---|---|---|
| JP | WO2014188517 A | 2/2017 |
| WO | 2009012243 | 1/2009 |
| WO | 2009128339 | 10/2009 |
| WO | 2009135210 | 11/2009 |
| WO | 2011153172 | 8/2011 |
| WO | 2011153173 | 8/2011 |
| WO | 2011153174 | 8/2011 |
| WO | 2011153175 | 8/2011 |
| WO | WO2020039276 A1 | 2/2020 |

OTHER PUBLICATIONS

Fogel, Robert B., et al.; Within-Breath Control of Genioglossal Muscle Activation in Humans: Effect of Sleep-Wake State; The Journal of Physiology 550, 899-910; Aug. 1, 2003 (published online as of Jun. 13, 2003).

Garner, Dena P., The Effects of Mouthpiece Use on Gas Exchange Parameters During Steady-State in College-Aged Men and Woman, Journal of the American Dental Association 142(9), Sep. 2011.

Cheng, S., Movement of the Tongue During Normal Breathing in Awake, Healthy Humans, The Journal of Physiology 586, 4283-4294, Sep. 1, 2008 (published online as of Jul. 17, 2008).

Okeson; "Fundamentals of Occlusion and Temporomandibular Disorders" (The C. V. Mosby Company, St. Louis, 1985), p. 333-340.

Lucia; "Modern Gnathological Concepts—Updated" (Quintessence Publishing Co., Inc., Chicago, 1983), Chapters 2, 3, and 4 (pp. 29-63).

Shore; A Mandibular autorepositioning Appliance, JADA, vol. 75, Oct. 1967.

Shore, Nathan Allen, "Temporomandibular Joint Dysfunction and Occlusal Equilibration", J.B. Lippincott Compan, 1976 [Second Edition], Philadelphia, pp. 237-241.

Various Authors, Compednium of Continuing Education in Dentistry, 30(2) Aegis Publications LLC, 2009.

D.P. Garner & E.J. Mcdivitt, Effects of Mouthpiece Use on Lactate and Cortisol Levels During and After 30 Minutes of Treadmill Running, Open Access Journal of Science and Technology, vol. 3, Agial Publishing House, 2015.

D.P. Garner, Effects of Various Mouthpieces On Respiratory Physiology During Steady-State Exercise in College-Aged Subjects, Sports Dentistry & Mouthgards, Academy of General Dentistry, Nov./Dec. 2015.

A.J. Miller, Oral and Pharyngeal Reflexes in the Mammalian Nervous System: Their Diverse Range in Complexity and Theh Pivotal Role of the Tongue, Crit. Rev. Oral Biol. Med., Inern'l & American Assoc. for Dental Research, 13(5): 409-425, 2002.

J.P. Saboisky, B.J. Luu, J.E. Butler, S.C. Gandevia, Effects of Tongue Position and Lung Volume on Voluntary Mximal Tongue Protrusion Force in Humands, Respiratory Physiology & Neurobiology, Elsevier, Dec. 4, 2014.

J.E. Schmidt, C.R. Carlson, A.R. Usery, A.S. Quevedo, Effects of Tongue Position on Mandibular Muscle Activity and Heart Rate Function, Oral Surg. Oral Med. Oral Path. Oral Radiol. Endod, Mosby Inc., 108:881-888, 2009.

D.P. Gardner, W.D. Dudgeon, E.J. Mcdivitt, The Effects of Mouthpiece Use on Cortisol Levels During an Intense Bout of Resistance Exercise, J. of Strength and Conditioning Research, National Strench & Conditioning Assoc., 25(10), 2011.

Garner, Dudgeon, Mcdivitt and Scheett, The Effects of Mouthpiece Use on Gas Exchange Parameters During Steady-State Exercise in College-Aged Men and Women. J Am. Dent. Assoc., Am Dental Assoc., 142(9) 1041-1047, 2011.

Murakami, S., Maeda, Y., Ghanem, A., Uchiyama, Y., & Kreilborg, S. Influence of Mouthguard on Temporomandibular Joint. Scand J Med Sports, 18, 591-595 (2008).

Pae, A., Yoo, R., Noh, K, Pake, J., & Kwon, K. The Effects of Mouthguards on the Athletic Ability of Professional Golfers. Dnen Traumatol, John Wiley & SON, 29, 47-51 (2013).

Freedman, George; The Dentist's Role in Sport Performance Mouthwear, Oral Health, Dec. 1, 2010 (https://www.oralhealthgroup.com/features/the-dentists-role-in-sport-performance-mouthwear).

www.underarmour.com; UA Performance Mouthwear (Year: 2009).

U.S. Appl. No. 16/406,324, filed May 8, 2019 titled "Dental Appliance Apparatus and Respiratory Enhancement".

U.S. Appl. No. 16/516,958, filed Jul. 19, 2019 titled "Single Arch Dental Device and Method of Manufacture".

U.S. Appl. No. 61/132,588, filed Jun. 19, 2008 titled Composite oral appliances and methods for manufacture.

U.S. Appl. No. 16/519,665, filed Jul. 23, 2019 titled "Methods of Respiratory Enhancement Using A Dental Appliance".

Amazon Customer Reviews—New Age Performance—Products; Publication: Oct. 11, 2024 / 7 pages (Earliest review date: Jan. 21, 2019).

LA Times; Money where mouth is; Publication: Nov. 6, 2009; URL: https://www.latimes.com/archives/la-xpm-2009-nov-06-sp-nfl-farmer6-story.html / 5 pages.

Spotlight on Business Magazine; New Age Performance; Dragon's Den season 12 (Canadian version) premiered on Sep. 27, 2017; URL: https://spotlightonbusinessmagazine.com/real-science-real-results-real-people-new-age-performance/ / 7 pages.

Dragons Den Pitch—New Age Performance; Dragon's Den season 12 (Canadian version) premiered on Sep. 27, 2017; URL: https://www.cbc.ca/dragonsden/pitches/new-age-performance / 3 pages.

Bolzern Frank, Appliance for the Treatment of Snoring and Abstructive Sleep Apnea, Jul. 5, 2019 (Year: 2019).

* cited by examiner

ORAL APPLIANCE

INCORPORATION BY REFERENCE

Any and all applications for which a foreign or domestic priority claim is identified in the Application Data Sheet as filed with the present application are hereby incorporated by reference herein and made a part of the present disclosure.

BACKGROUND

1. Field of the Invention

Present embodiments related to an oral appliance. More specifically, but without limitation, present embodiments relate to an oral appliance which improves aerobic performance when used during workouts or other athletic endeavors and muscle recovery during sleep.

2. Description of the Related Art

High intensity and endurance athletes continually desire to improve performance achievements. One way to improve performance is to improve breathing performance by providing the lungs with additional air supply, which in turn provides additional oxygen to muscles. However, there are limited manners in which to provide additional air. The air supply may in part be limited in part by respiratory rate. However, increasing respiratory rates may also make the body work harder but not on the performance goal.

It would be desirable to improve aerobic performance independent of increased respiratory rates. It would be desirable to decrease respiratory rate. It also would be desirable to reduce cortisol build up in the muscles.

Additionally, it would be beneficial to improve muscle recovery during sleep by maximizing oxygen and restfulness.

The information included in this Background section of the specification, including any references cited herein and any description or discussion thereof, is included for technical reference purposes only and is not to be regarded as subject matter by which the scope of the invention is to be bound.

SUMMARY

The present application discloses one or more of the features recited in the appended claims and/or the following features which alone or in any combination, may comprise patentable subject matter.

Present embodiments provide an oral appliance which improves aerobic performance by providing more airflow to the user's lungs. Present embodiments provide an oral appliance which reduces respiratory rates. Present embodiments provide an oral appliance which improves muscle endurance and which reduces cortisol build up. Present embodiments also relate to an oral appliance which improves restful sleep by reducing snoring and improving oxygen intake, thus improving muscle recovery while sleeping.

According to some embodiments, an oral appliance may comprise a first body having a first lingual wall extending between an anterior direction and a posterior direction and a first facial wall extending between the anterior direction and the posterior direction, an first occlusal surface extending between the first lingual wall and the first facial wall. A second body may have a second lingual wall extending between the anterior direction and the posterior direction and a second facial wall extending between the anterior direction and the posterior direction. A second occlusal surface may extend between the second lingual wall and the second facial wall. A connector may extend between the first body and the second body and upper lingual corners of the body. And, a first lobe may extend from an anterior end of the first facial wall and a second lobe extending from an anterior end of the second facial wall.

According to some optional embodiments, the following features may be combined with the oral appliance either individually or in combination with other of the following optional features and the oral appliance. The first body, the second body, and the connector may define an external portion. The oral appliance may further comprise an internal portion disposed within the external portion. Each of the first lingual wall and the second lingual wall may have a contoured surface. Each of the first facial wall and the second facial wall may have a contoured surface. Each of the first body and the second body capable of biased engagement with a wearer's teeth. The first lobe and the second lobe may have a first portion and a second portion. The first and second lobes may curve to a lower elevation. The first and second lobes being disposed at an elevation below the connector. The connector may have a flat upper surface. The first occlusal surface and the second occlusal surface may be a flat surface. The first and second lingual walls may have a height that is less than the first and second facial walls. The oral appliance may be formed of a first material and a second material.

According to some embodiments, an oral appliance may comprise an external portion and an internal portion disposed within the external portion, the external portion having: a first body and a second body and connector extending between, the internal portion having: an internal support disposed within each of the first body and the second body, and a connector support disposed within the connector, the connector support extending between the internal supports. A first lobe may extend from a lower facial anterior corner of the first body and a second lobe extending from a lower facial anterior corner the second body. The connector may extend from an upper lingual anterior corner of the bodies.

According to some optional embodiments, the following features may be combined with the oral appliance either individually or in combination with other of the following optional features and the oral appliance. The internal supports may each have at least one support bar extending therefrom and disposed within the external portion. The first body and the second body each may have a either a flat or wedge shaped occlusal surface. The external portion may be formed of a first material and the internal portion being formed of a second material. The first material may be a VISTAMAXX and the second material being an EVA or polypropylene.

According to some embodiments, an oral appliance, comprises an external portion having: a first body having a first lingual wall extending between an anterior direction and a posterior direction and a first facial wall extending between the anterior direction and the posterior direction; a first occlusal surface extending between the first lingual wall and the first facial wall; a second body having a second lingual wall extending between the anterior direction and the posterior direction and a second facial wall extending between the anterior direction and the posterior direction; a second occlusal surface extending between the second lingual wall and the second facial wall; a connector extending between the first body and the second body at upper lingual corners of the first and second bodies; and, a first lobe extending from an anterior end of the first facial wall and a second lobe extending from an anterior end of the second facial wall. An internal portion having: an internal support disposed within each of the first body and the second body, a connector support disposed within the connector, the connector support extending between the internal supports; and, a plurality of protuberances extending from lingual sides of each of the first and second bodies.

In some embodiments, the first body and the second body may each have a notch along the first and second lingual walls.

In some embodiments, each of the internal supports may comprise the plurality of protuberances formed integrally with each of the internal supports.

In some embodiments, each of the plurality of protuberances may pass through one of the notches.

In some embodiments, each of the plurality of protuberances may be located on the external portion, located on the internal portion, or located on both.

In some embodiments, the plurality of protuberances may have varying shape moving in the anterior direction.

In some embodiments, the connectors may have a first end and a second end.

In some embodiments, the first end and the second end may be disposed at a first elevation.

In some embodiments, the connector may have a second elevation at a location between the first end and the second end, the second elevation being lower than the first elevation.

In some embodiments, the external portion may be formed of a first material.

In some embodiments, the first material being a VISTAMAXX.

In some embodiments, the internal portion may be formed of a second material.

In some embodiments, the second material may be EVA or polypropylene.

In some embodiments, the internal support defining a bite pad.

In some embodiments, the bite pad may be exposed through the external portion or covered by the external portion.

In some embodiments, the bite pad may be flush with the first or second occlusal surface.

In some embodiments, the bite pad may be raised relative to the first or second occlusal surface.

In some embodiments, the oral appliance may further comprise stippling on the internal portion, or the external portion, or both of the internal portion and the external portion.

According to some embodiments, an oral appliance, comprises an external portion having: a first body having a first channel shape formed of a first lingual wall extending between an anterior direction, a posterior direction and a first facial wall extending between the anterior direction and the posterior direction, and a first occlusal surface extending between the first lingual wall and the first facial wall; a second body having a second channel shape formed of a second lingual wall extending between the anterior direction and the posterior direction and a second facial wall extending between the anterior direction and the posterior direction, and a second occlusal surface extending between the second lingual wall and the second facial wall; a connector extending between the first body and the second body and having a lower elevation between ends of the connector; and, a first lobe extending from an anterior end of the first facial wall and a second lobe extending from an anterior end of the second facial wall. An internal portion having an internal support disposed within each of the first body and the second body, a connector support disposed within the connector, the connector support extending between the internal supports; a plurality of protuberances extending from lingual sides of each of the first and second bodies, the plurality of protuberances formed on the external portion, the internal portion, or both; and, a stippling formed on a lower surface of the connector, the connector support, or both, the stippling formed on a lower surface.

In some embodiments, the first lobe and the second lobe spaced from the first and second lingual walls and the connector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an oral appliance will now be described by way of examples. These embodiments are not to limit the scope of the claims as other embodiments of an oral appliance will become apparent to one having ordinary skill in the art upon reading the instant description. Non-limiting examples of the present embodiments are shown in figures wherein:

DETAILED DESCRIPTION

Figure 1:
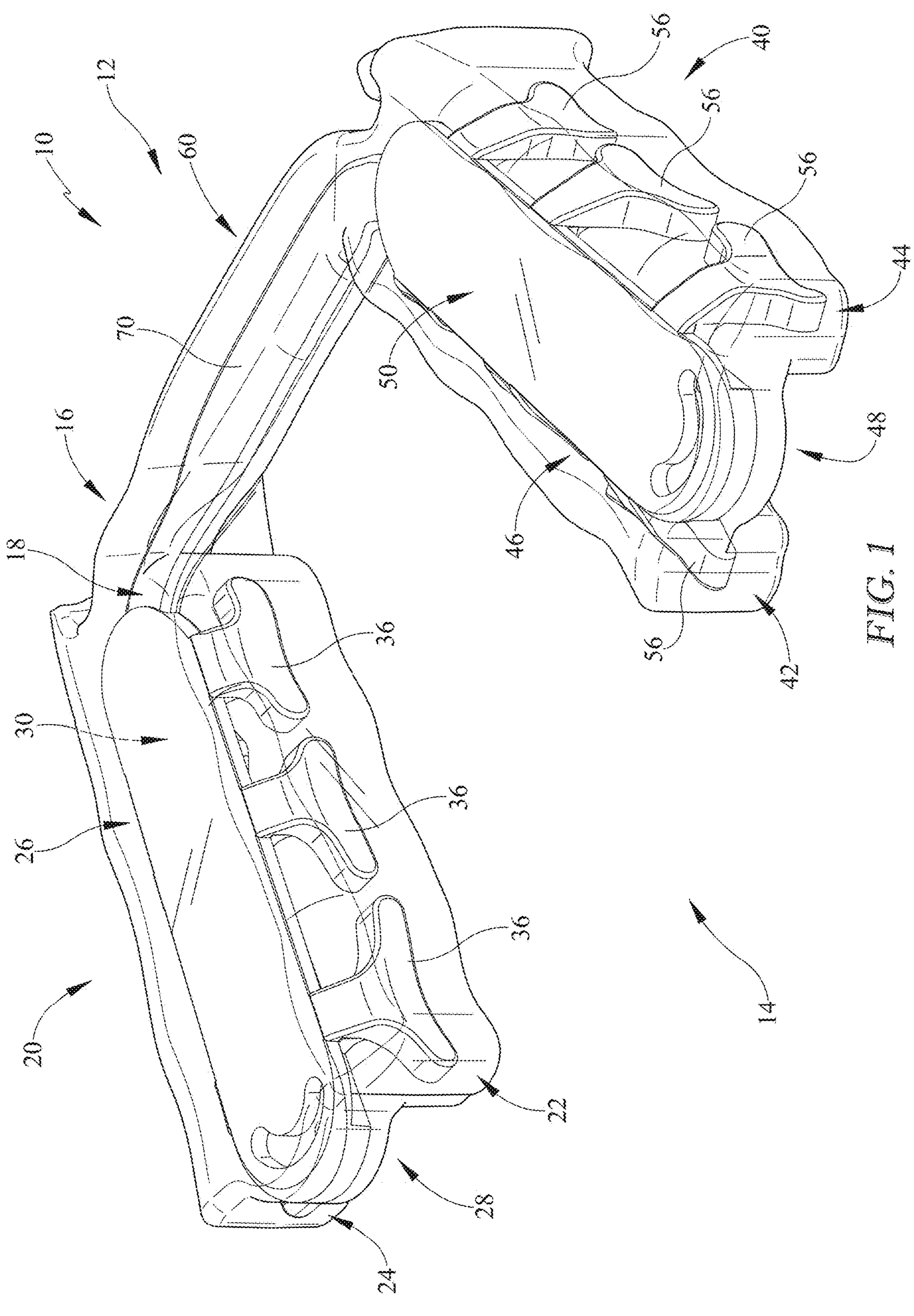
FIG. 1 is a first perspective view of the oral appliance.

It is to be understood that an oral appliance is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

With reference to FIGS. 1-12, present embodiments related to oral appliances which improve aerobic performance by reducing respiratory rates, increasing airflow to the lungs, reducing cortisol build up and improving muscle endurance.

As used herein, ventilation is the measure of air into and out of the lungs, and respiratory rate is the measure of the exchange of oxygen and carbon dioxide within the lungs. Specifically, ventilation is the defined as the liters per minute. Respiratory rate is defined herein as breaths per minute. Tidal volume is defined herein as the volume of air inhaled and exhaled during one breath.

Anterior, as used herein, refers to portions of the mouth proximate the front of the mouth for example, proximate the lips or the front incisors. Posterior, as used herein, refers to the back of the mouth, for example, proximate the 3rd molar (if present) or the pharynx. Mesial, as used here, refers to the midline of the mouth. The central incisors are usually located on either side of the mesial line or midline. For example, a structure that extends mesially may extend toward the mesial line or midline, and a structure that is positioned mesially may be positioned about the mesial line or midline. Axial, as used herein, refers to directions along a vertical axis of the body as, for example, generally defined by the spinal column.

A forward shift of the mandible such as may occur with the dental appliance implementations disclosed herein may increase the pharyngeal area. Applicant has found airway anatomical differences with various implementations of the dental appliance, specifically measuring the diameter and width of the oropharynx with computed tomography (CT) scans that demonstrated an average 9% improvement in both the diameter and width when subjects used the dental appliance. (See Garner, D. P. and McDivitt, E., Effects of mouthpiece use on airways openings and lactate levels in healthy college males. Compendium: A Supplement of Continuing Education in Dentistry, 30 (2): 9-13 (2009)).

Finally, it was found that implementations of the dental appliance that allowed subjects to clench all their teeth evenly with vertical displacement and a level pressure distribution between all teeth resulted in increased respiratory performance and desirable cortisol changes.

With reference now to FIG. 1, a perspective view of an oral appliance 10, also referred to as a dental appliance, is provided. The example is non-limiting and comprises a first body 20 and a second body 40 which are connected by a connector 60. The bodies 20, 40 and the connector 60 define an external portion 16 and the oral appliance 10 may also comprise an internal portion 18 disposed within the external portion 16. The bodies 20, 40 and connector 60 are joined to define a U-shaped structure which may be positioned within a user's mouth. The oral appliance 10 has an anterior end 12, oriented toward the front of a user's mouth, and a posterior end 14, oriented toward the rear, interior of a user's mouth.

The bodies 20, 40 are generally shaped as a u-shaped or n-shaped members which extend between the anterior and posterior ends 12, 14. The bodies 20, 40 each are formed to fit over one or more of the user's teeth. For example, the bodies 20, 40 of oral appliance 10 engage the mandibular 1st bicuspid, mandibular 2nd bicuspid, mandibular 1st molar, mandibular 2nd molar, and mandibular 3rd molar on the right and left sides, respectively.

Each body 20, 40 comprises a lingual wall 22, 42 respectively, a facial wall 24, 44 respectively and an occlusal surface 26, 46 respectively extending between the lingual wall and the facial wall. Each of the lingual walls 22, 42 and the facial wall 24, 44 are oriented in a generally vertical orientation. The occlusal surfaces 26, 46 join the lingual walls 22, 42 and facial walls 24, 44, of each body 20, 40 and are oriented generally horizontally. The occlusal surfaces 26, 46 may be tapered from a thicker (vertically) location to a thinner location in a front to rear direction or in a rear to front direction.

Each body 20, 40 generally defines a dental trough 28, 48 between the respective walls and occlusal surface. The dental troughs 28, 48 each provide a location wherein the user's one or more teeth may be located. The dental trough 28, 48 may be fit to the user's teeth in order to conform to the shape of the user's teeth including interstices between the user's teeth.

The body 20, 40 may be formed of one or more materials. In various aspects, the body material may be transformable between a pliable state and a non-pliable state. In the pliable state, the bodies 20, 40 or the occlusal surfaces 26, 46 of the bodies 20, 40 may be shaped to conform to the one or more teeth of the user. In the non-pliable state, the bodies 20, 40 generally retain its conformance to the teeth of the user as shaped when in the pliable state. In various aspects, the occlusal surfaces 26, 46 may be transformed between the pliable state and the non-pliable state by heating and cooling, respectively. For example, heating the occlusal surfaces 26, 46 material in warm water may allow the occlusal surface 26, 46 to be fitted to the user's teeth and, after having been fitted, the occlusal surface material may be cooled to the non-pliant state thereby capturing the fit of the user's teeth in the occlusal pad material. The occlusal surfaces 26, 46 materials are transformed from the non-pliable state to the pliable state at a temperature tolerable by the user upon placement of the occlusal pad material in the pliable state within the user's mouth, in various aspects. The occlusal surfaces 26, 46 materials may transform between the non-pliant and pliant state at a temperature greater than human body temperature but less than about 100° C., in various implementations.

The oral appliance 10 may be formed of various materials. In some embodiments, the oral appliance may be formed of a single material. In some embodiments, the oral appliance may be formed of two or more materials. The two or more materials may be entirely different materials or may be differing grades of the same material. Various combinations may be utilized.

In some embodiments, the oral appliance 10 material may include a mixture of polycaprolactone. An exemplary polycaprolactone is Capra 6500 polycaprolactone from Perstorp, UK Limited, Warrington, Cheshire UK. In various aspects, the oral appliance 10 includes a mixture of polycaprolactone and ethylene vinyl acetate (EVA) such as ELVAX®. In various aspects, the occlusal pad material of body includes ethylene vinyl acetate (EVA) alone, such as ELVAX®. In various aspects, the body may include a mixture of polycaprolactone and a polyolefin elastomer, and the polyolefin elastomer may be a copolymer of ethylene and octene-1. An exemplary copolymer is available as ENGAGE® from Dupont Canada, Inc., P.O. Box 2200, Streetsville, Mississauga, Ontario L5M 2H3.

For example, in some embodiments, the material may include ethyl-vinyl acetate (EVA); thermoplastic polyolefin, various ethylene-based elastomers; various hydrocarbon resins (which are may be combined with EVA, thermoplastic polyolefin, or various ethylene-based elastomers), polycaprolactone (which may be combined with EVA), low-density polyethylene, high density poly-ethylene, polycarbonate and/or various polymers, laminates and other materials that will be recognized by those skilled in the art upon review of the present disclosure. In some embodiments, the composite material may be a pre-laminated sheet including a layer of polycarbonate bound to a layer of polyester urethane which is available under the trade name Durasoft® from the Scheu Dental Co. located in Iserlohn, Germany. Typically, these materials may be selected with a durometer (hardness) of between about 70 A to about 96 A or between about 55D and about 90D.

In some embodiments, an additional material may be added to the occlusal surface of each body 20, 40 to define a bite pad. It may be desirable that the occlusal surface 26, 46, or the bite pad, or both, be formed of a material having preselected properties for example to better interact with teeth. The occlusal surface, or a bite pad build-up of material, or both may be formed of material including a mixture of styrene block copolymer and ethylene vinyl acetate (EVA). An exemplary styrene block copolymer is available as DYNAFLEX® part number G2782 from GLS Corporation, Thermoplastic Elastomers Division, 833 Ridgeview Dr., McHenry, Ill. 60050. EVA is available from a number of sources, such as the ELVAX® resins from Dupont Packaging and Industrial Polymers, 1007 Market Street, Wilmington, Del. 19898.

In some other embodiments, the oral appliance 10 may be formed of a polyolefin elastomer such as a copolymer of ethylene and octene-1. An exemplary copolymer is available as ENGAGE® from Dupont Canada, Inc., P.O. Box 2200, Streetsville, Mississauga, Ontario L5M 2H3. In other embodiments, the oral appliance 10 may be formed of a thermoplastic rubber, which may be a thermoplastic elastomer and a thermoplastic urethane with polyolefin elastomers such as Santoprene® thermoplastic elastomer from Advanced Elastomer Systems, L. P., 388 South Main Street, Akron, Ohio 44311 and Kraton® thermoplastic elastomer from the Shell Oil Company, Houston, Tex. Kraton® includes a styrene-ethylenelbutylenes-styrene block copolymer. In various aspects, the occlusal surface, an optional bite pad, or both material may include polypropylene part number AP6112-HS from Huntsman Corporation, Chesapeake, Va. 23320. In various aspects, the bite pad material may include HD-6706 ESCORENE® Injection Molding Resin [a high-density polyethylene] from ExxonMobil Chemical Company, P.O. Box 3272, Houston, Tex.

Additionally, in some embodiments, the bodies 20, 40 and connector 60 may be formed of VISTAMAXX. The polymer blend of the moldable portion, for example bodies 20, 40, and connector 60 may include one or more grades of Vistamaxx™ produced by ExxonMobil of Houston, Tex. 77253. Table 1 includes a listing of various grades of Vistamaxx™ that may be used in the moldable portion and various respective properties, including ethylene content, Vicat softening point (ASTM D 1525), flexural modulus, and hardness (ASTM D2240) Shore D/A. The grades of Vistamaxx™ provided in Table 1 are merely illustrative, non-exhaustive, and should not be considered limiting.

TABLE 1

| Grade Name | Ethylene Content (weight %) | Vica Softening Point ASTM D 1525° C. (° F.) | Flexural Modulus-1% Secant (psi) | Hardness 15 sec ASTM D2240 Shore D/A |
|---|---|---|---|---|
| 3588 | 4 | 103 (217) | 58400 | 50D (Very hard) |
| 3980FL | 9 | 77.3 (171) | 17000 | 34D (Hard) |
| 3000 | 11 | 65.0 (149) | 9050 | 27D (Soft/Hard) |
| 6502 | 13 | 51.4 (125) | 2960 | 71 (Soft) |
| 6102 | 16 | 53.0 (129) | 2090 | 67A (Soft) |

In some instances, it may be desirable to blend two or more grades of Vistamaxx™ at varying percentages in order to achieve a desired level of hardness and/or impact resistance of the composition of the moldable exterior portion.

The oral appliance 10 for example may be made from a thermoplastic polyolefin elastomer may be formed in some non-limiting examples as set forth in Table 2. The oral appliance of VISTAMAXX comprises physical and mechanical properties that match or surpass prior art EVA mouthpieces. The oral appliance 10 may provide a greater rate of crystallization or fitting time, i.e., the time interval before the material stiffens at body temperature, which improves fitting of the oral appliance. Oral appliance 10 takes 2 to 3 minutes for the mouthguard to harden providing the user ample time to properly fit the mouthguard. During this time interval, the material remains soft and extensible. In addition, the high shrinkage of oral appliance 10 allows the device to shrink, giving a snug fit with excellent retention to the teeth and jaw within 5 minutes.

TABLE 2

| Physical and Mechanical Properties | |
|---|---|
| Density, g/cc | 0.86-0.89 |
| Melting Point ° C. | 55-160 |
| Tensile Strength (psi) | 2200-4500 |
| Die C Tear Strength (ibf/in) | 130-330 |
| Elongation at Break (%) | 100-1500 |
| Flexural Modulus (psi)) | 1500-6500 |
| Hardness (Shore A) | 50-90 |
| Shrinkage to teeth | Excellent |
| Overall fitting time | 2-3 minutes |

The connector 60 extends between the first body 20 and the second body 40. The connector 60 extends from or near an upper lingual corner of each body 20, 40. More specifically, the connector 60 may extend from the anterior lingual end each of body 20, 40. The connector 60 has a thickness in the anterior-posterior direction which may be constant or may vary. In some embodiments for example, the connector 60 is shown thinner, horizontally, at the ends near the bodies 20, 40 and is thicker at the central area of the connector 60 between the bodies 20, 40.

In some embodiments, the oral appliance 10 may be formed of two materials. For example in some embodiments, the bodies 20, 40 and connector 60 define the external portion 16 and may be formed of an exterior material, for example VISTAMAXX and further comprise an internal portion 18 formed of internal supports 30, 50 and a connector support 70 formed of an EVA.

The internal support 30 is located within the body 20 and the internal support 50 is located within the body 40. The internal supports 30, 50 may be flat or wedge shaped with a taper in a length-wise direction and may have a length that extends through the bodies 20, 40. The internal supports 30, 50 may be elongate and in some embodiments have rounded ends.

Extending from each of the supports are a plurality of support bars 36, 56. The support bars 36, 56 may be various shapes but in some embodiments may be T-shaped. In the depicted embodiment, the support bars 36, 56 may be located on the lingual side, the facial side or both of the internal supports 30, 50. In some embodiments, the support bars 36, 56 may be T-shaped to improve stability to the side walls 22, 24, 42, 44 when the user microwaves and forms the guard. These support bars 36, 56 also inhibit the walls 22, 24, 42, 44 from collapsing when the user bites down and smashes the sidewall to the bite pad roof.

Further, each of the supports 30, 50 may be joined by a connector support 70. The connector support 70 is depicted internally of the connector 60. In some embodiments, the internal supports 30, 50 and the connector support 70 are formed as a single structure. Once the internal supports 30, 50 and the connector support 70 are formed, the bodies 20, 40 and the connector 60 are formed thereabout. This may be in a single mold for example where the internal supports 30, 50 and connector 70 are first formed then a second molding occurs. Alternatively, the oral appliance 10 may be formed in separate molds wherein the internal portions formed in a first mold and then they are located in a second mold for formation of the bodies 20, 40 and connector 60.

Additionally, the oral appliance 10 may be opaque or may be semi-transparent, or may be some combination. For example, present embodiments have an external portion 16 which is semi-transparent with the internal portion 18 being opaque. This provides visual indication of the two materials used in some embodiments.

Figure 2:
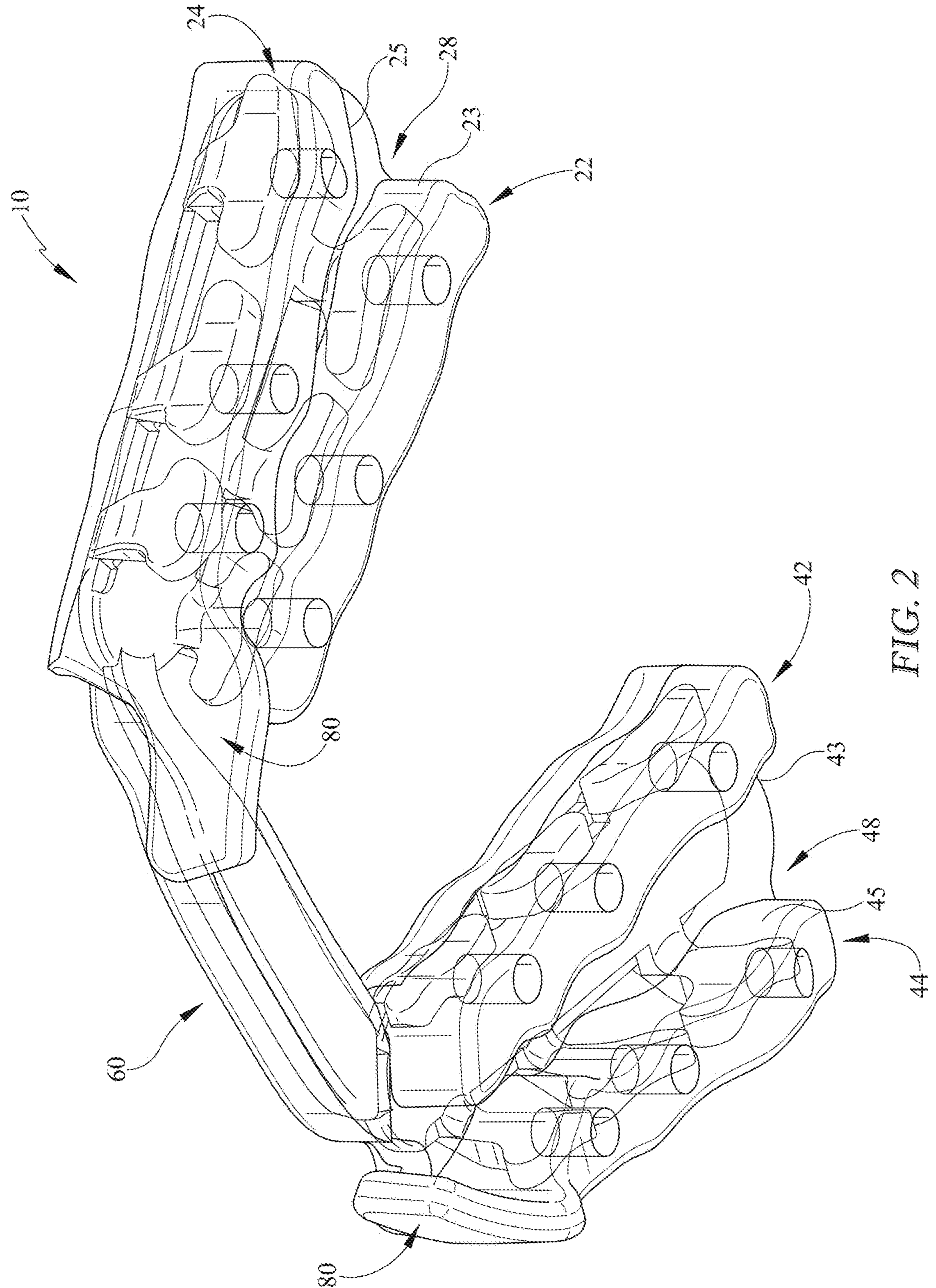
FIG. 2 is a second perspective view of the oral appliance.

Referring now to FIG. 2, the oral appliance 10 is shown in a second perspective view. In the lower perspective view, the connector 60 is again shown. In a vertical direction, the connector 60 may have a constant or varying thickness, and in the instant embodiment, for example, the vertical thickness is generally constant.

Also shown in this view, the facial walls 24, 44 each further comprise a lobe 80. Extending from the anterior end 12 of the facial walls 24, 44, the lobes 80 extends downward and in an anterior direction of the oral appliance 10. The lobes 80 may improve retention on the teeth in the area of the lobes and along the facial surface of such teeth. The lobes 80 may also push the lower lip outward slightly. Additionally, a space is formed between the lobes 80 and the lingual walls 22, 42, creates a space for teeth and aid to retain the oral appliance 10 in position due to engagement with the teeth in the area of the lobes 80.

With reference again to the first body 20 and second body 40, the bodies each comprise the dental trough 28, 48 respectively, which allows for positioning of one or more of the user's teeth. The inward facing surface 23, 25, 43, 45 of each of the lingual and facial walls 22, 24, 42, 44 may be contoured, varying the width of the dental troughs 28, 48. With the varying thickness of each dental trough 28, 48, the lingual and facial walls of each body 20, 40 provide biased engagement of the user's teeth. The varying width and contours may be shaped to conform to the user's one or more teeth. For example, the contours may be formed to engage and conform to the cusps of the user's teeth. Additionally, the upper surface of the dental trough may be also shaped to conform to the occlusal surfaces of the one or more teeth disposed within each dental trough of each body. The conformances to the user's one or more teeth may more evenly distribute the force from clenching or impact and improve retention and fitment of the oral appliance. In some other embodiments, the lingual and facial walls may be of constant thickness.

Also shown in the depicted figure, the outer facial walls 24, 44 of each body 20, 40 and the lingual walls 22, 42 are also contoured. The contour of the outer surfaces of the facial walls 24, 44 may be formed to replicate the contours of the user's teeth in the area where the oral appliance 10 is mounted.

Figure 3:
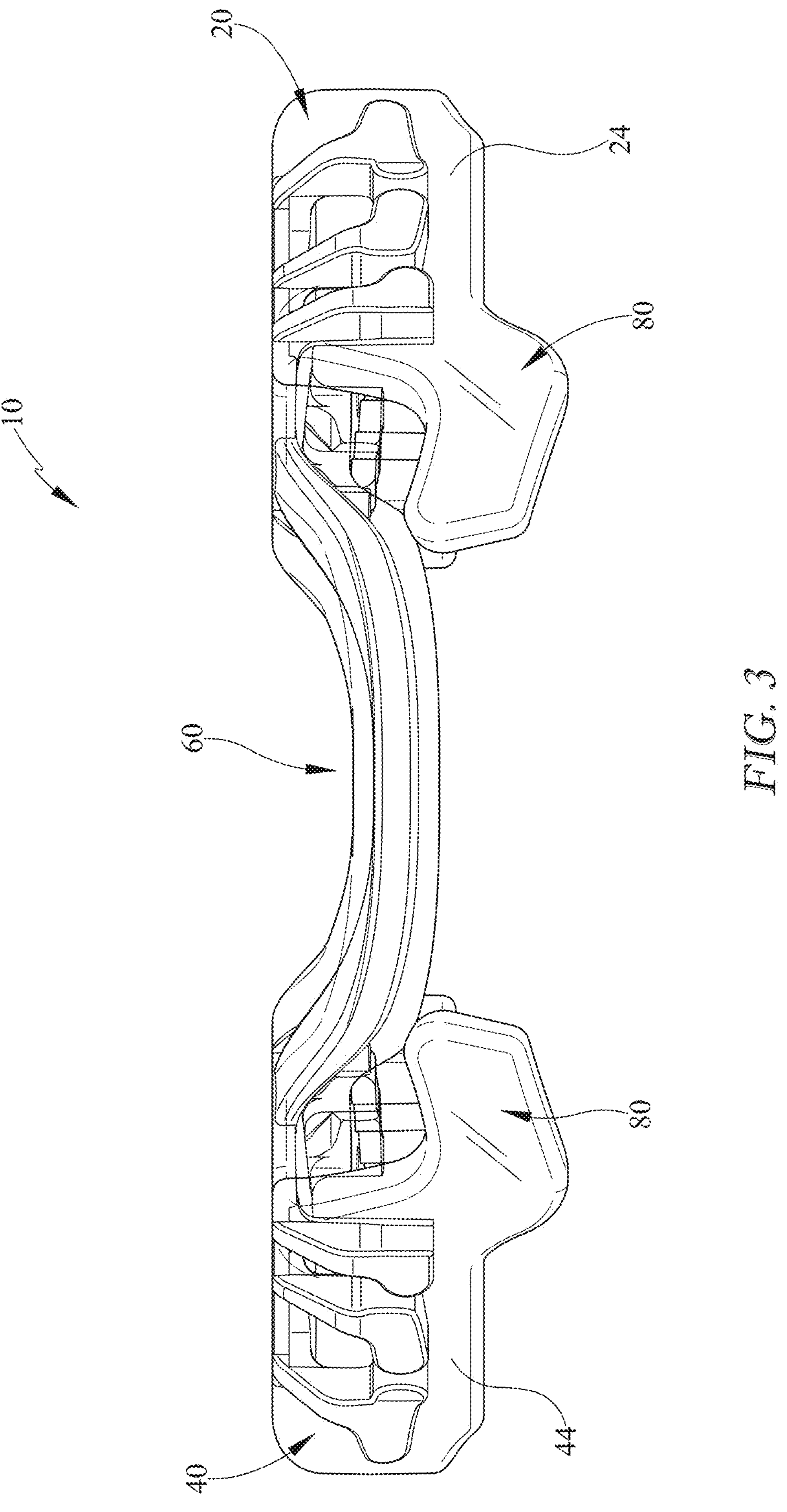
FIG. 3 is a front elevation view of the oral appliance.

Referring now to FIG. 3, a further embodiment is shown in front view of the oral appliance 10. In this view, the lobes 80 are shown depending from the lower anterior corners of the facial walls 24, 44. The lobes 80 may be linear or may be curved to place a retention force on the on the facial side of the teeth of gums in the area of the lobes 80. The lobes 80 also are at least partially positioned below a lower edge of each body 20, 40 and therefore are vertically lower than the connector 60.

Also shown in the view, the connector 60 extends from the upper anterior corners of the lingual walls 22, 42, and drops slightly in elevation before extending across the forward portion of the oral appliance 10. When viewed in combination with the perspective view of FIGS. 1 and 2, the lobes 80 are disposed forward or anterior of the connector 60, creating the space for teeth therebetween.

Figure 4:
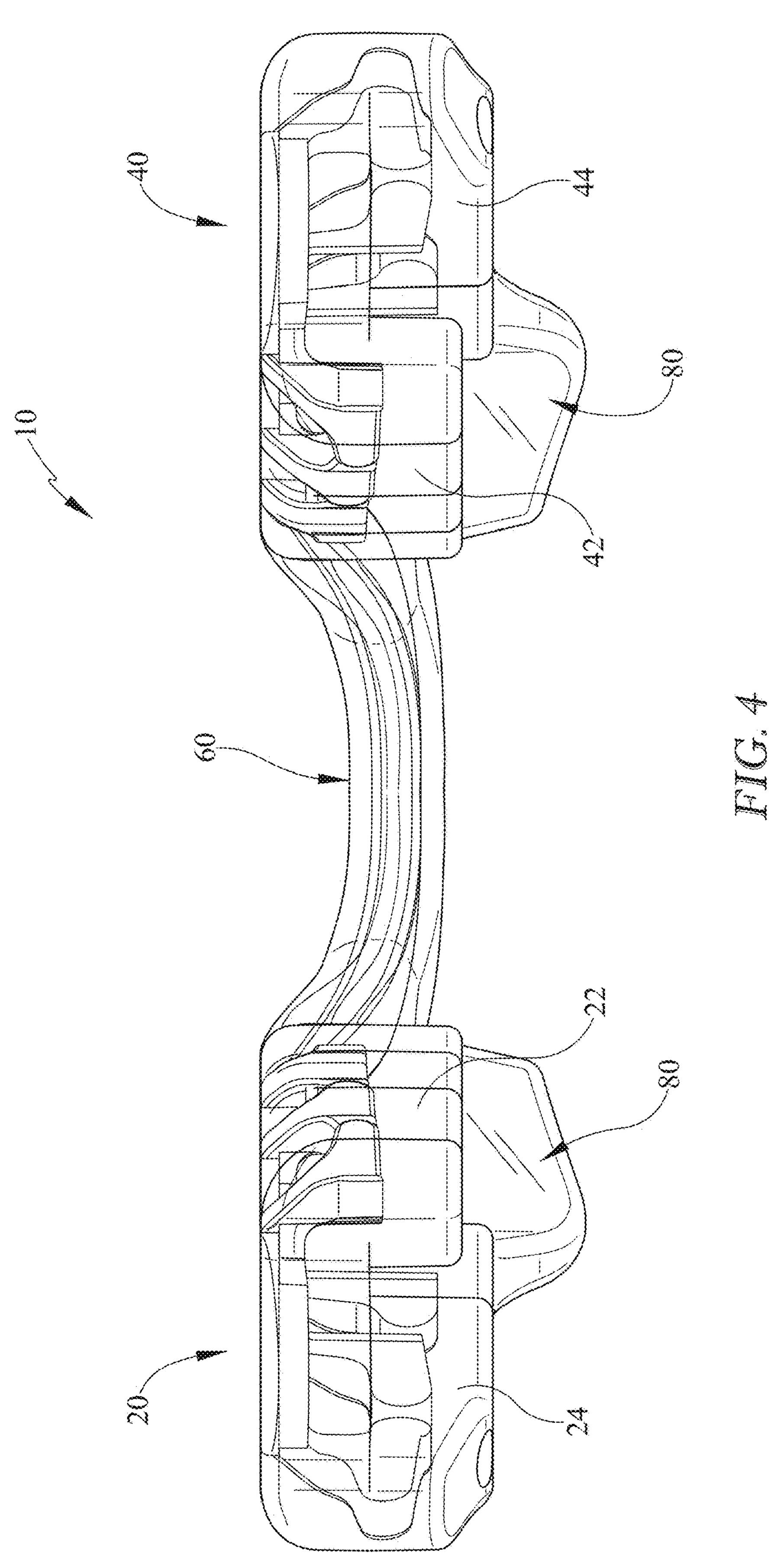
FIG. 4 is a rear elevation view of the oral appliance.

Referring now to FIG. 4, a rear view of the oral appliance 10 is shown. In some embodiments, the lingual walls 22, 42 are shorter in height than the facial walls 24, 44 of each body 20, 40. Accordingly, when depending from the occlusal surfaces 26, 46, facial walls 24, 44 depend downwardly farther than the lingual walls 22, 42. In some other embodiments, the walls 24, 44 may be of the same height and therefore depend the same distance downward.

Also shown in this view, the lobes 80 are disposed below the connector 60 such that the lower edge of lobes 80 are lower than the connector 60 and additionally lower than the facial and lingual walls.

Figure 5:
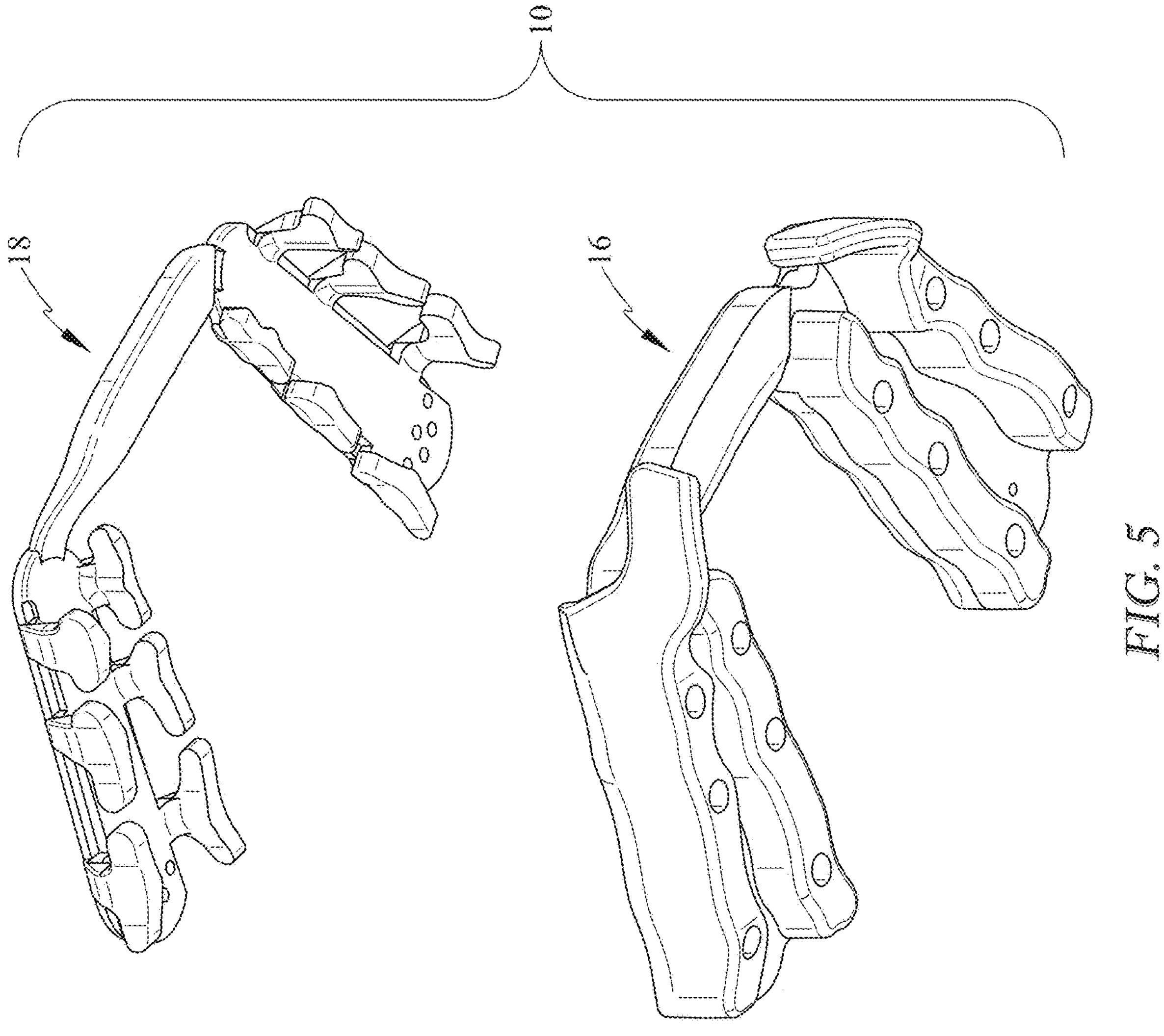
FIG. 5 is an exploded perspective view of the internal and external portions of the oral appliance.

With reference now to FIG. 5, an exploded view of the oral appliance 10 is depicted with the internal portion 18 removed from the external portion 16. As shown in this embodiment, the internal portion 18 is shown in its formed condition before the external portion 16 formed around internal portion 18. As noted previously, the internal portion 18 may be formed first and then placed in a mold for a second process wherein the external portion 16 (bodies 20, 40, and connector 60) are formed. The internal portion 18 may be formed in a first mold and then moved to a second mold for forming of the exterior portion 16. Or alternatively, the internal portion 18 may be formed and the second molding of the exterior portion 16 occur in the same mold.

Figure 6:
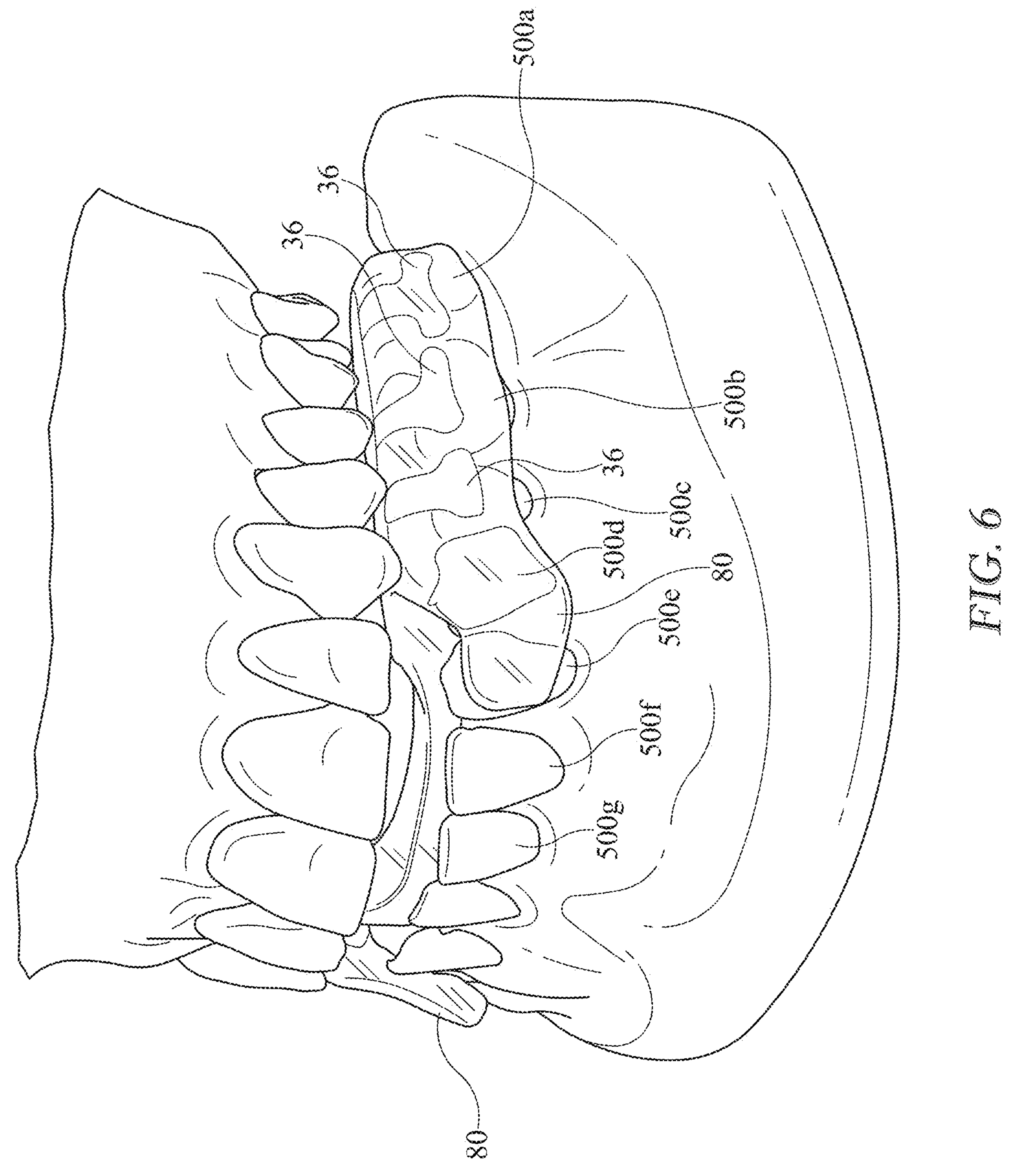
FIG. 6 is a perspective view of the oral appliance disposed in an example mouth.

With reference to FIG. 6, a perspective view of the oral appliance 10 is depicted on the lower mandibular area of the user's mouth. The bodies 20, 40 of oral appliance 10 or the lobes 80 may engage the mandibular teeth. In the depicted embodiment, the mandibular teeth may be selected from one or more of tooth 500*a*, 500*b*, 500*c*, 500*d*, 500*e*, 500*f*, 500*g*, where these teeth are the left mandibular 2nd molar, left mandibular Pt molar, left mandibular 2nd bicuspid, left mandibular Pt bicuspid, left mandibular cuspid, left mandibular lateral incisor, left mandibular central incisor, respectively. The same teeth may be engaged on the right side. Also shown in this view, the connector 70 is disposed behind the anterior teeth and the teeth 500*d*, 500*e* are disposed between the lobe 80 and the connector 70.

Figure 7:
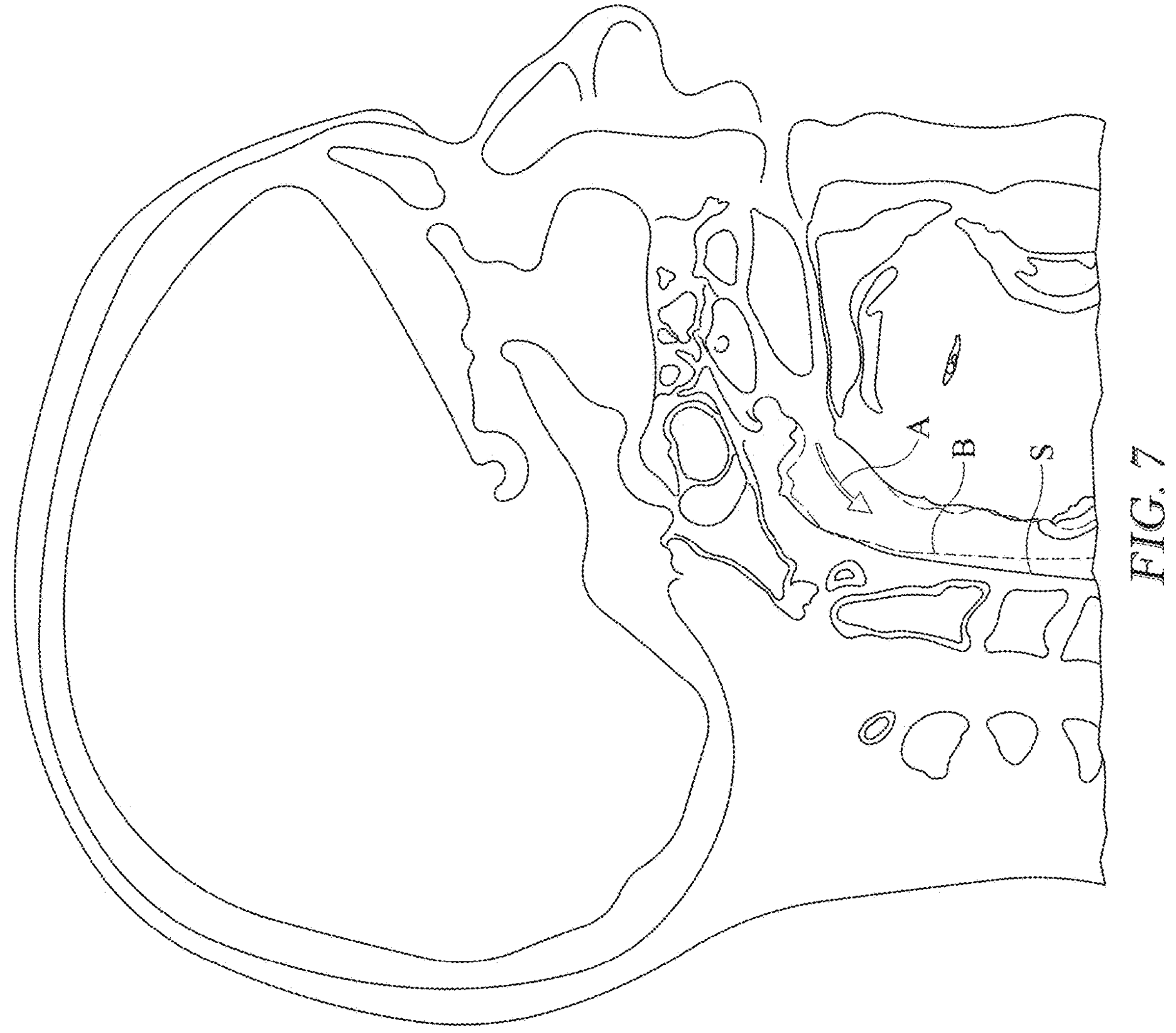
FIG. 7 is a view of the user's airway increase.

With reference now to FIG. 7, a side section view of a user or wearer is shown. The view depicts two opening sizes of the airway A in the throat area. The opening is shown in broken line B in a first position and in solid line S in a second position. The broken line B represents the air way in a normal position without the oral appliance 10 in place. The solid line S represents the airway in a second position with the oral appliance 10 in place in the user's mouth. With the oral appliance 10 in use, the jaw is pushed forward, causing additional opening of the airway A for improved breathing. This is achieved by opening of the airway A. Breathing performance can improve up to 20 percent and on average about 10 percent.

Figure 8:
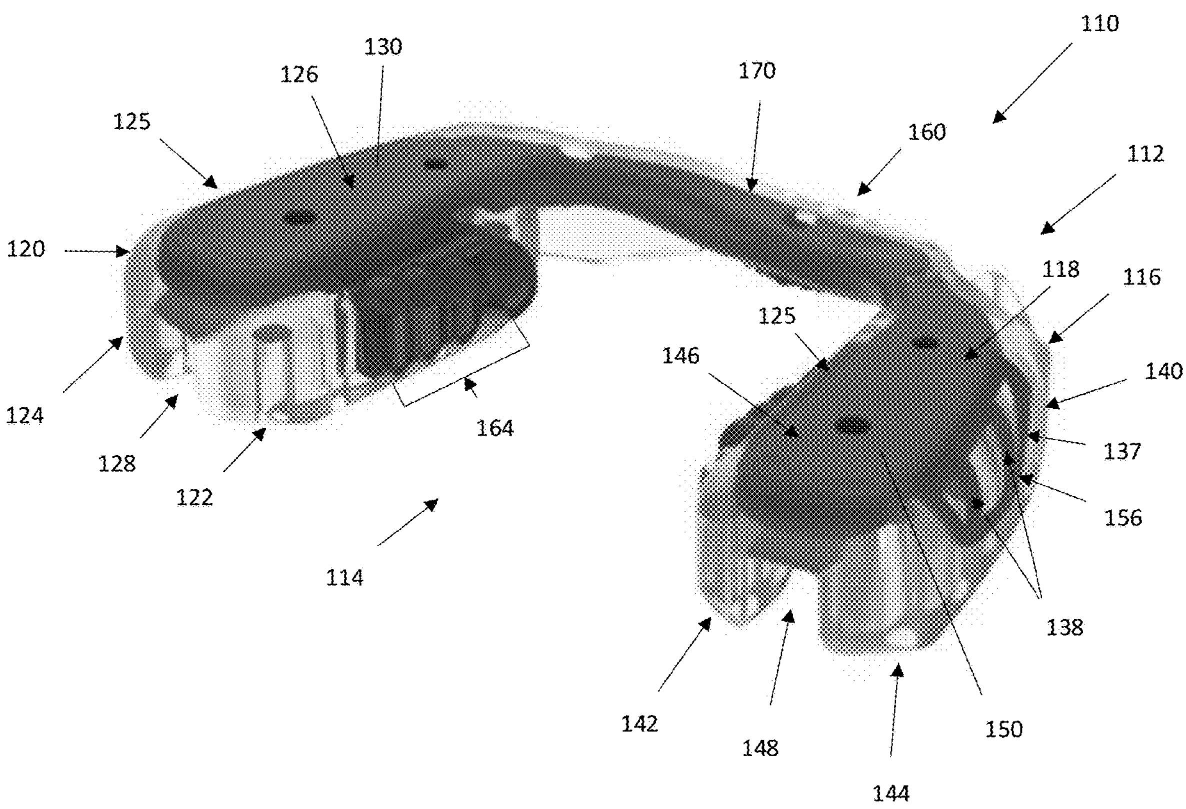
FIG. 8 is a perspective view of a further embodiment of an oral appliance.

With reference now to FIG. 8, a further embodiment is depicted in perspective view. The oral appliance 110 in this example may comprise an external portion 116 and an internal portion 118, as in previous embodiments. The instant oral appliance 110 improves muscle recovery by directing the tongue forward and downward, thus opening the airway and allowing for improved respiration and oxygen intake. During nesting periods, this promotes improved sleep quality and thus accelerated recovery by way of better sleep, improved restoration of energy and improved muscle repair.

In the perspective view, the oral appliance 110 comprises an external portion 116 and an internal portion 118 that provides support to the external portion 116. The external portion 116 and the internal portion 118 are described separately but are constructed together for use. In some embodiments, the external portion 116 may completely encompass the internal portion 118 or in other embodiments, internal portion 118 may protrude from the external portion 116 for example through an opening in the external portion, or in still other embodiments, the external portion 116 may have a thin covering layer over the internal portion 118. The oral appliance 110 has an anterior end 112, oriented toward the front of a user's mouth, and a posterior end 114, oriented toward the rear, interior of a user's mouth. The external portion 116 is shown having a first body 120 and a second body 140, wherein each body 120, 140 comprises a lingual wall 122 closer to the mesial line and a facial wall 124 further from the mesial line. The walls 122, 124 may be planar or may be non-planar in construction. The body 140 likewise may comprise walls 142, 144.

Extending between each lingual wall 122, 142 and facial wall 124, 144 is a respective occlusal surface 126, 146. Each body 120, 140 therefore forms a u-shaped or n-shaped trough, or more generally a channel shape. The channel shape is defined by troughs 128, 148 which are configured to receive teeth of the wearer in the manner previously described. In the depicted orientation for example, the oral appliance 110 may be positioned on a user's lower teeth. The occlusal surfaces 126, 146 may be continuous across the upper portions of the oral appliance 110, or alternatively, the internal supports 130, 150 may be exposed through the occlusal surfaces 126, 146 to define bite pads 125. In other words, the wearer's upper teeth may engage the occlusal surfaces 126, 146 (e.g. the external portions 116), or may engage the internal supports 130 extending through the occlusal surfaces 126, 146.

Further, the depicted oral appliance 110 provides a connector 160 which extends between said first body 120 and said second body 140. The connector 160 is similar to the connector 60 shown in the embodiments of FIGS. 1-7. In some embodiments, the connector 160 extends from a lingual, anterior area of each body 120, 140 and extends from an upper surface of the bodies 120, 140. The connector 160 is generally U-shaped and changes elevation along the path between the first body 120 and the second body 140. The connector 160 may be higher at the ends of the connector 160 where connected to the bodies 120, 140. The central area of the connector 160 may be lower than the ends of the connector at the bodies 120, 140. The connector 160 may have various cross sections. In the depicted embodiments, the upper and lower surfaces may be flat and the anterior and posterior surfaces are generally vertical, wherein rounded corners join the surfaces. The connector 160 has an upper elevation that is positioned at or near upper edges of the wearer's lower front teeth. The front to rear thickness of the connector 160 defines a shelf and in combination with the elevation of the connector 160 creates a space beneath the connector 160 wherein the tongue is positioned downwardly. The connector 160 also functions as a flange which the tongue is drawn to engage, and which the anterior-posterior dimension encourages guidance and retention of the tongue downward positioning.

The connector 160 has a thickness in the anterior-posterior direction which may be constant or may vary. In some embodiments for example, the connector 160 is shown thinner, horizontally, at the ends near the bodies 120, 140 and is thicker at the central area of the connector 160 between the bodies 120, 140. As noted, since the connector 160 may vary in elevation between the bodies, 120, 140, the connector 160 extends from an upper elevation of the bodies and decreases in elevation so that the connector 160 may be positioned behind the users lower teeth, when worn. The dimensions of the connector 160 may be sufficient to promote tongue contraction.

Further, when the oral appliance 110 is worn and the connector 160 is generally located behind, or posterior to, the user's lower teeth, the anterior end or tip of the tongue engages the connector 160. The reaction of the tongue is to move down and result in opening of the airway in the throat.

The bodies 120, 140 may be formed of one or more materials and in some aspects may be formed of a material that is transformable from a pliable state to a non-pliable state. In the pliable state, the bodies 120, 140 or the occlusal surfaces 126, 146 of the bodies 120, 140 may be shaped to conform to the one or more teeth of the user. In the non-pliable state, each of the bodies 120, 140 generally retains its conformance to the teeth of the user as shaped when in the pliable state. As previously described the transformation may occur by heating then cooling the bodies 120, 140. For example, the oral appliance 110 may be heated, applied to the user's mouth for fitting to the user's teeth at the elevated temperature and in the pliable state. Upon fitting, the oral appliance 110 may be cooled to the non-pliant state.

The occlusal surface 126, 146 may, for example, be formed of the same material as the remainder of the bodies

120, 140, or may be formed of a different material, or may be formed of a combination of two or more materials that may include the same material as the remainder of the bodies 120, 140.

In some embodiments, the oral appliance 110 may be formed of two materials. For example in some embodiments, the bodies 120, 140 and connector 160 define the external portion 116 and may be formed of an exterior material, for example VISTAMAXX. Further, the internal portion 118 defining internal supports 130, 150 and a connector support 170 may be formed of an EVA material or in some embodiments a polypropylene material-high or low density, which may be more rigid and firm than the exterior material. The internal supports 130, 150 and the connector support 170 may comprise a single structure that is co-molded with the external portion 116 during manufacture of the oral appliance 110.

The internal supports 130, 150 are disposed within the bodies 120, 140, respectively. Portions of the internal support 130, 150 in the area of the occlusal surface 126, 146 of the bodies 120, 140 may be flat or wedge shaped with varying vertical thickness. The internal supports 130, 150 may be constant width or may be tapered in the area of the occlusal surface 126, 146. The internal support 130, 150 may comprise various shapes and as shown in the instant embodiment may be generally elongate and have rounded ends. As noted previously, the internal supports 130, 150 may also extend through, or be exposed from, the occlusal surfaces 126, 146 of the external portion 116 to define the bite pads 125. In other embodiments, the internal supports 130, 150 may be covered by, and therefore unexposed relative to, the external portions 116. Additionally, in some embodiments, the external portion and the internal portion may be of different colors to give visual indication to the wearer of the different materials.

In the instant embodiment, the internal portions 118 may further comprise internal support bars 136 (FIG. 10), 156. Whereas in the prior embodiments the support bars were shown as upside down t-shaped structures and not connected to one another, the instant support bars 136, 156 may be formed of a plurality of linear or curvilinear segments 138 and interconnected within the external portion 116. The interconnection of the plurality of segments 138 may provide strength in multiple directions once the external portion 116 is co-molded with the internal portion 118. The plurality of segments 138 are generally extending from the internal supports 130, 150 of the internal portion 118, extending in the facial direction and downwardly into the facial walls 124, 144. The segments 138 may be interconnected by a lower segment or cross-member 137 within each of the facial walls 124, 144. The plurality of segments 138 and the cross-member 137 may define a truss which provides rigidity to the lingual wall 122 and aids to retain the internal portion 118 in a specific position within the external portion 116.

Along the top surface of the bodies 120, 140, the occlusal surface 126, 146 may comprise the external portion 116 only, or may comprise a combination of the external portion 116 and the internal portion 118. For example, in some embodiments, the upper surface may solely be defined by the material of the external portion 116. In some other embodiments, the upper surface of the internal portion 118 may actually extend through the material of the external portion 116 defining the bite pad 125 through the occlusal surfaces 126, 146. The internal portion 118 may be plate-like and formed of a harder material which can better withstand bite pressure and force that occurs in the occlusal surfaces 126, 146 of the oral appliance 110. Thus it should be understood that a portion of the internal portion 118 may actually be at an exterior surface for example flush with the external portion 116 or may be raised slightly. Further, in some other embodiments, the internal portion 118 may be covered by the material defining the external portion 116. Thus, various configurations of the materials may be provided in the area of the bodies 120, 140, for example the occlusal areas 126, 146.

Figure 9:
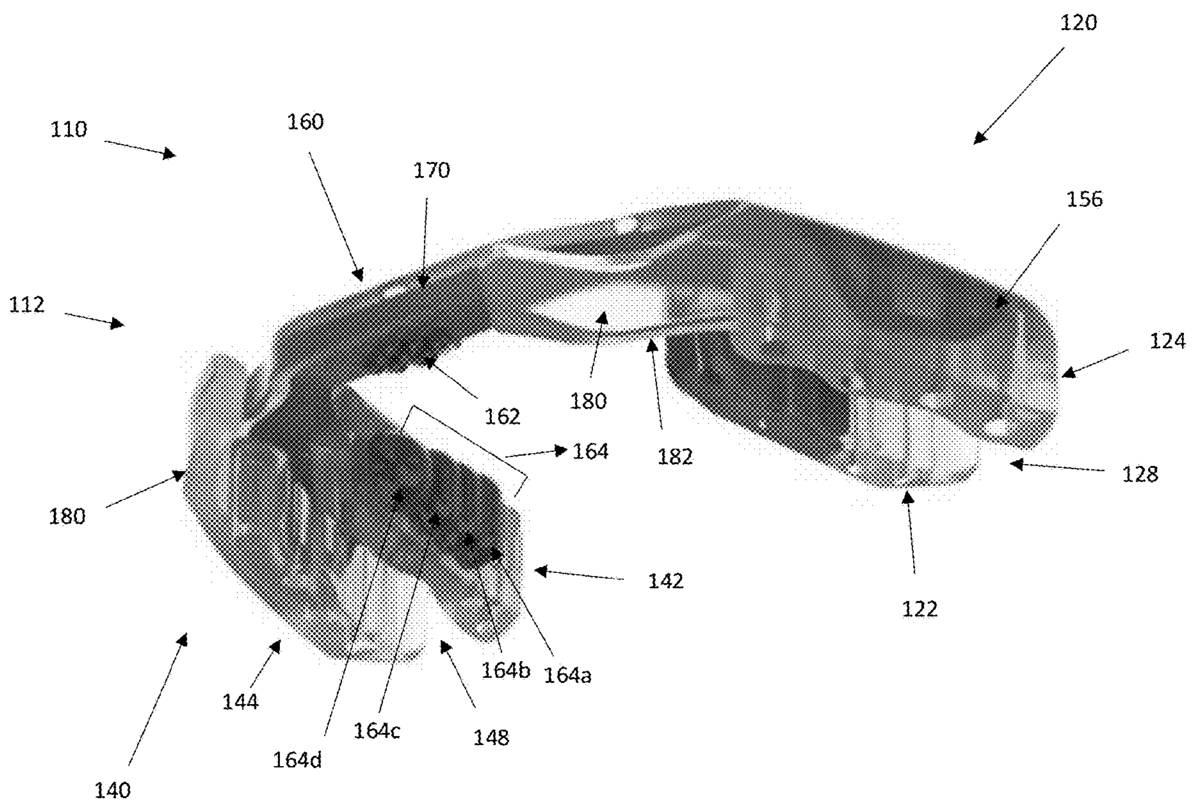
FIG. 9 is a lower perspective view of the oral appliance of FIG. 8.

With reference now to FIG. 9, a lower perspective view of the oral appliance 110 of FIG. 8 is shown. In this view the forward or anterior end 112 of the oral appliance 110 is depicted. The oral appliance 110 further comprises lobes 180 that extend from the anterior areas of the bodies 120, 140. In some embodiments, the lobes 180 extend from anterior ends of the facial walls 124, 144. The lobes 180 function to push the lower lip outward slightly and may purse the lips of the wearer as well. Additionally, in some embodiments, the lobes may taper from a longer height at the facial walls 124, 144 to a more narrow height at ends of the lobes 180.

The lobes 180 extend downward and in an anterior direction of the oral appliance 110. The lobes 180 may improve retention on the teeth in the area of the lobes 180 and along the facial surfaces of such teeth. Additionally, a space 182 is formed between the lobes 180 and the lingual walls 122, which creates a space for lower teeth and aids to retain the oral appliance 110 in position due to engagement with the teeth in the area of the lobes 180. Likewise, the lobes 180 may also be positioned below the connector 160 and forward of the connector to accommodate lower front teeth of the wearer between the connector 160 and the lobes 180. The space 182 between the connector 160 and the lobes 180 in the anterior posterior direction may be constant or may vary. Each of the lobes 180 may be formed of one or more linear portions or may be curved to provide a retention force on the on the facial side of the teeth or gums in the area of the lobes 180. The lobes 180 also are at least partially positioned below a lower edge of each body 120, 140 and therefore are vertically lower than the connector 160. When the oral appliance is worn, the lobes 180 may be forward or anterior of the wearer's lower teeth and the connector is rearward or posterior relative to the teeth. In some embodiments, the lobes 180 do not comprise any internal portion of stiffer material and therefore may flex when worn to accommodate the wearer's teeth along the inner surface of the lobes 180.

In this view, a lower surface of the connector 160 is shown. As in the previous embodiment, the connector 160 is provided with the interior connector support 170. The connector 160 may comprise a stippling 162 comprising a plurality of specks which may be raised (convex) relative to the lower surface of the connector 160 or may be a plurality of depressions or indentations (concave) in the surface of the connector 160. The stippling 162 creates a surface difference with the remainder of the connector 160 lower surface and draws the tongue to the area once the difference is felt. The stippling 162, whether raised structures or depressions are shown as generally hemi-spherical and having a circular cross-section. However, while the semispherical shape is shown, other shapes may define the stippling 162.

The stippling 162 may be defined by a single size of specks, or may be defined by one or more sizes. Additionally, the stippling 162 may be defined by a pattern, for example, by one or more rows, or one or more columns. The stippling specks 162 may be offset from one another in the columnar direction or the row direction, for example. Further, for example, the specks of the stippling 162 may comprise a non-organized, or random, arrangement or layout. The stippling 162 may be formed on the internal portion, the external portion, or both.

Additionally, in this view, the bodies 120, 140 define channels 128, 148 wherein teeth are positioned during use. The inner surfaces of the walls provide undulating surface to accommodate undulations in the users teeth, and improve the fit for the wearer.

With reference now to both FIGS. 8 and 9, attention is now drawn to the lingual walls 122 which provide a plurality of protuberances 164. The protuberances 164 engage the hypoglossal nerve of the tongue and cause the muscle movement to direct the tongue forward and downward. Additionally, the tongue engagement of the stippling 162 on the lower surface of the connector 160 also causes movement of the tongue downward and forward. Thus both features result in movement of the tongue and opening of the wearer's airway. The protuberances 164 may be formed on the internal portion 118 and may protrude through the external portion 116, in some embodiments. In other embodiments, the protuberances 164 may be formed on the external portion 116. In still other embodiments, the protuberances may be formed on both, for example forward the internal portion 118 and covered by the external portion 116.

The protuberances 164 are located along the lingual walls 122, 142 and extend mesially toward the tongue. The protuberances 164 may be of the same shape or may be of differing shapes. In some embodiments, the protuberances 164 are shown of differing shapes and size. For example, starting at the posterior most protuberance 164*a*, the shape is elongate vertically with rounded upper and lower ends. Moving in the anterior direction, the second protuberance 164*b* is of a similar shape the first protuberance 164*a* but is shorter in height. A third protuberance 164*c*, again moving anteriorly, is provided which is shorter in height than the first and second protuberances 164*a*, 164*b*. The decreasing height creates spacing for, and guides, the tongue down and forward below the connector 160.

Moving further anteriorly from the first three protuberances 164*a-c*, a fourth protuberance 164*d* is provided which differs in shape. The fourth protuberance 164*d* is semi-spherical in shape and has a diameter that is about the same size as the height of the third protuberance 164*c*. Thus shapes may differ and size may differ according to some embodiments.

The protuberances 164 may be formed on the external portion 116, the internal portion 118, or both. In some embodiments, the protuberances 169 may be formed on the internal portion 118 to extend through the external portion 116. This may be done in the molding process by not allowing material of the external portion 116 to be located over the outer surfaces of the protuberances 164, if on the internal portion 118 only. Alternatively, a window or notch 165 may be formed in each lingual wall of the bodies 120, 140, so that the protuberances 164 of the internal portion 118 extend through the notch or window 165 of the external portion 116. In alternate embodiments, the protuberances 164 may be formed solely on the lingual wall 122 of the external portion 116. In such embodiments, the internal portions 118 may have supports on the lingual sides toward the protuberances 164. Finally, in still further embodiments, the internal portions 118 may comprise the protuberances 164 and the external portion 116 may be formed over the internal portion 118 so that both internal and external portions 118, 116 comprise the protuberances 164.

Additionally, even in embodiments where the protuberances 164, 169 are formed on either or both the internal and external portions 118, 116, additional protuberances may be formed on the external material. The instant embodiment comprises the additional protuberances 169 (FIG. 10) in the posterior direction of the lingual walls 122 and on the external portion 116 only, for example. The different reference numbers 164 and 169 are used merely for clarity of description and those skilled in the art should will understand based on this teaching that the protuberances may be formed on either or both of the internal and/or external portions 118, 116.

Also shown more clearly in the lower perspective view, the channels or troughs 128, 148 formed by the inside surfaces of the lingual walls 122 and the facial walls 124 may vary in width. The varying width may provide that the surfaces of the troughs 128, 148 engage the wearer's teeth for a snug fit.

Figure 10:
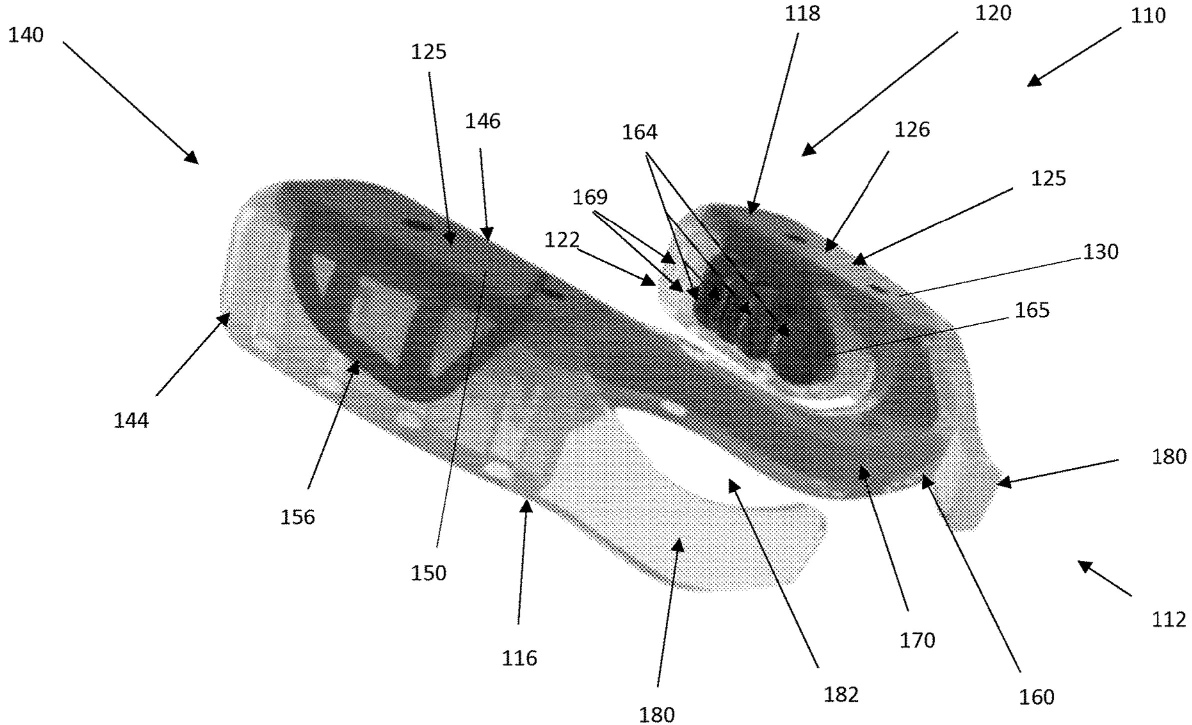
FIG. 10 is an upper perspective view of the oral appliance of FIG. 8.

Referring now to FIG. 10, a further upper perspective view of the oral appliance 110 of FIG. 8 is depicted. The view of FIG. 10 shows the protuberances 164 of the opposite lingual wall 122 from those of FIG. 9. Additionally, the spaces 182 between the connector 160 and the lobes 180 are shown.

Figure 11:
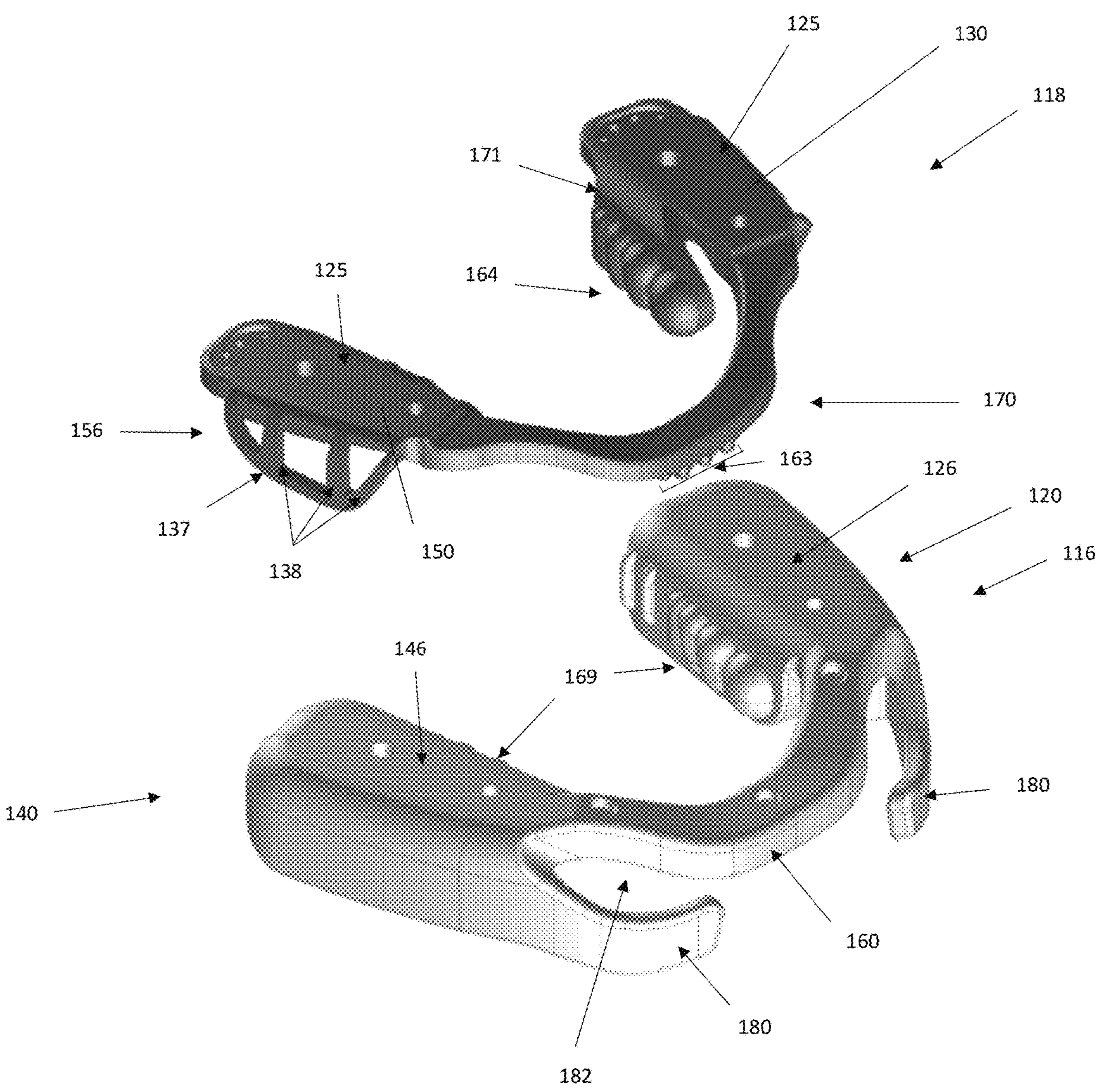
FIG. 11 is an exploded upper perspective view of the internal and external portions of the oral appliance of FIG. 8.

Referring now to FIG. 11, the external portion 116 and the internal portion 118 are exploded such that the internal portion 118 is removed from the external portion 116. The internal portion 118 is depicted above the external portion 116. The external portion 116 comprises first and second bodies 120, 140 and the connector 160. In some embodiments, the external portion 116 may be made of a slightly softer, or less rigid, material than the internal portion 118.

The internal portion 118 may be recessed and covered by a portion of the occlusal surfaces 126, 146 of the oral appliance 110. Alternatively, the internal portion 118 may extend through the occlusal surfaces 126, 146 and either be flush with the surfaces 126, 146, or may be raised relative to these surfaces. For example, when exposed through the occlusal surfaces 126, 146, the internal portion 118 may define a bite pad 125 that is located in the occlusal surface area 126, 146. The bite pads 125 whether exposed from, or when covered by the external portion 116, are formed to be hard, durable and may be impenetrable.

Additionally, the plurality of protuberances 164 are shown on a flange 171 depending from the bite pad 125 portion of the internal portion 118. The connector support 170 is also shown extending from the anterior ends of the bite pads 125 so to connect the two bite pads 125. In other embodiments, the bite pad 125 may be a soft material.

The flanges 171 and protuberances 164 depend from the lingual side of the bite pad 125. Specifically, the flange 171 depends from the bite pad 125 and the protuberances 164 are shown extending from the lingual side of the flange 171. The protuberances 164 may be of varying size. In the depicted view, each protuberance 164 may extend from the flange 171 at a differing distance.

On the depicted facial side, the support bar 156 is shown depending from the bite pad 125. The support bar 156 is made up of a plurality of segments 138 forming the truss-like shape. The segments 138 are interconnected with cross-member 137 and when molded over with the material of the external portion 116, the material of the external portion 116 may extend between the segments 138. The support bar 156 provides support for the side walls of the external portions 116 bodies 120, 140, so they are supported during heating.

Also shown on a lower surface of the connector support 170 may be stippling 163. The stippling 163 may be depending from the lower surface of the connector support 170. The stippling 163 may extend through the connector

160 material and be exposed or the stippling 163 may be covered by the first material that defines the external portion 116.

Beneath the internal portion 118 is the external portion 116. The external portion 116 comprises a material that differs from the internal portion 118. In the view depicted, a plurality of protuberances 169 are shown on the lingual wall 122, wherein the different number is used merely for clarity of description. These protuberances 169 may be aligned with the protuberances 164 of the internal portion 118. As noted previously, where the external material 116 comprises the protuberances 169, the external material 116 may cover the protuberance 164 of the internal portion 118, or the protuberances 169 may be solely on the external portion 116. Alternately, the protuberances 164 of the internal portion 118 may be exposed relative to, or through, the external portion 116.

Also shown in this view, the space 182 is also more clearly seen between the connector 160 and the lobes 180. The space 182 provides clearance for the wearer's teeth by providing spacing between the anterior and posterior sides of the teeth. This allows the oral appliance to sit downwardly in the wearer's mouth, so that the connector 160 is behind the teeth. Since the lobes 180 have no internal stiffening material, the space 182 may change in dimension as wearer's teeth are positioned therein and the lobes 180 may be flexed outwardly.

Figure 12:
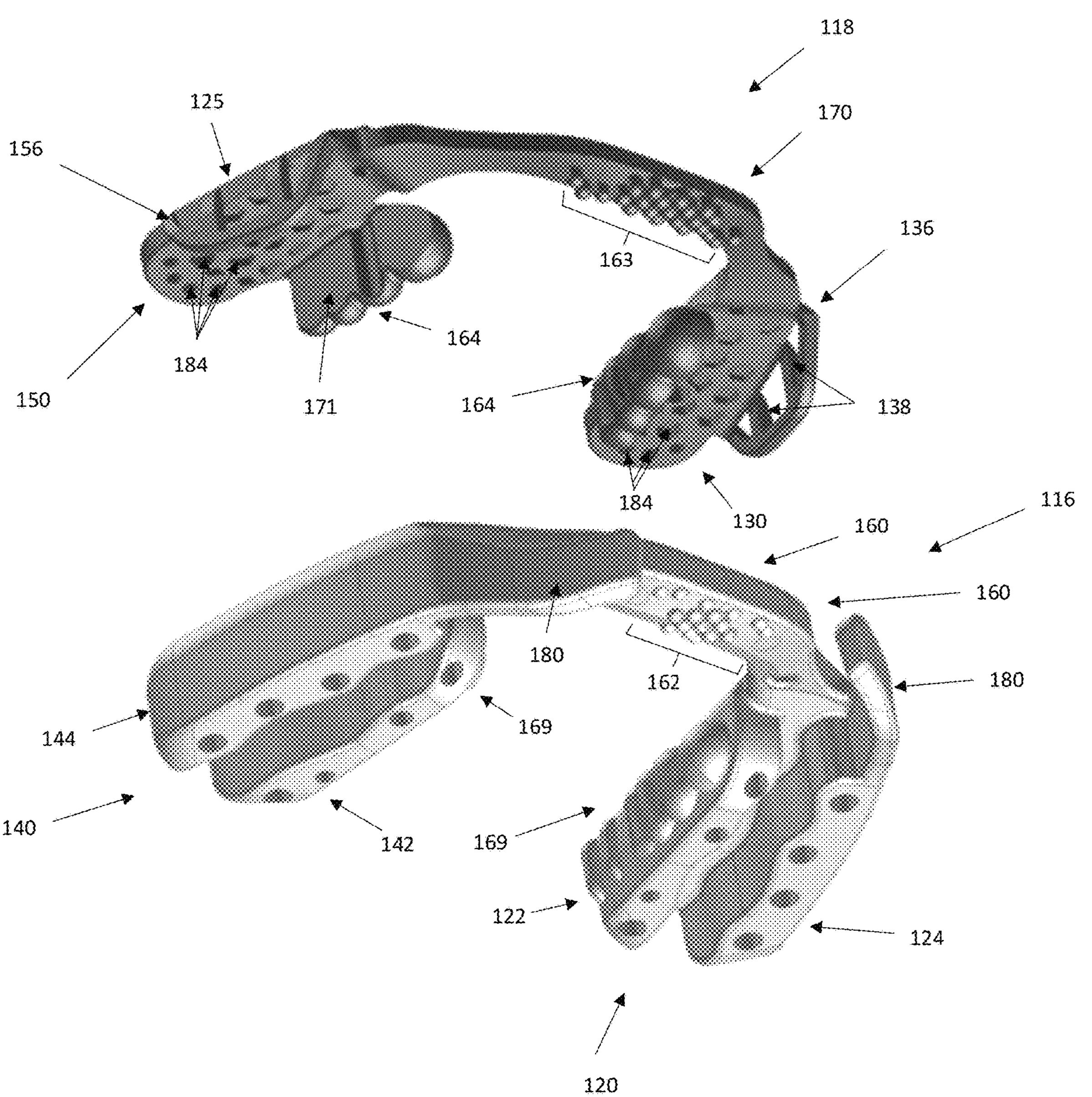
FIG. 12 is an exploded lower perspective view of the internal and external portions of the oral appliance of FIG. 8.

Referring now to FIG. 12, an exploded lower perspective view of the internal portion 118 and the external portion 116 is shown. As may be noted from this lower perspective view, the lower surfaces of the bite pads 125 may comprise a plurality of depressions or holes 184 which may or may not pass entirely through the material of the internal portion 118. The depressions or holes 184 may improve engagement in the area of the bodies 120, 140 with the material of the external portion 116. Further, the lower surface of the connector support 170 may comprise a plurality of stippling 163 such as specks which align and which do not align with the stippling 162 on the lower surface of the connector 160. The aligned stippling 163 of the connector support 170 may extend through and be exposed from the connector 160 (external portion). Alternatively, the aligned stippling 163 of the internal material may be covered by the external material 116 so that the stippling 162, 163 is formed by both the internal and the external portions 118, 116. In still other embodiments, like the protuberances 169, the stippling 162 may also be formed solely by the external portions 116.

As shown, the internal portion 118 comprises more stippling 163 than the external portion 116. The additional stippling 163 on the internal portion 118 may provide further engagement between the connector support 170 and the connector 160.

Referring now to both FIGS. 11 and 12, the external portion 116 comprises lobes 180 which depend from the bodies 120, 140 and extend in the anterior direction. The lobes 180 do not include internal support structure as the remainder of the external portion 116, and therefore may have more flexibility. The lobes 180 extend from the facial walls 124, 144 and are also spaced from the connector 160. Accordingly, when worn, the lobes 180 are spaced forward of the connector 160 so that the connector 160 is positioned behind the teeth and the lobes 180 are forward of the connector 160 pushing the lower lip of the wearer outward.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An oral appliance, comprising:

an external portion having:

a first body having a first lingual wall extending between an anterior direction and a posterior direction and a first facial wall extending between said anterior direction and the posterior direction;

a first occlusal surface extending between said first lingual wall and said first facial wall;

a second body having a second lingual wall extending between the anterior direction and the posterior direction and a second facial wall extending between the anterior direction and the posterior direction;

a second occlusal surface extending between said second lingual wall and said second facial wall;

a connector extending between said first body and said second body at upper lingual corners of said first and second bodies; and, a first lobe extending from an anterior end of said first facial wall and a second lobe extending from an anterior end of said second facial wall;

an internal portion having:

an internal support disposed within each of said first body and said second body, each of said internal supports comprising a plurality of protuberances formed integrally with each of said internal supports;

a connector support disposed within said connector, said connector support extending between said internal supports;

each of said plurality of protuberances passing through said first lingual wall and said second lingual wall, respectively and extending from lingual sides of each of said first and second bodies.

2. The oral appliance of claim 1, said external portion being formed of a first material.

3. The oral appliance of claim 2, said first material being a thermoplastic polyolefin elastomer.

4. The oral appliance of claim 2, said internal portion being formed of a second material.

5. The oral appliance of claim 4, said second material being ethylene vinyl acetate (EVA) or polypropylene.

6. The oral appliance of claim 1, said internal support defining a bite pad.

7. The oral appliance of claim 6, said bite pad being exposed through said external portion or covered by said external portion.

8. The oral appliance of claim 7, said bite pad being flush with said first or said second occlusal surface.

9. The oral appliance of claim 7, said bite pad being raised relative to said first or said second occlusal surface.

10. The oral appliance of claim 1, said connector having a first end and a second end.

11. The oral appliance of claim 10, said first end and said second end disposed at a first elevation.

12. The oral appliance of claim 11, said connector having a second elevation at a location between said first end and said second end, said second elevation being lower than said first elevation.

13. The oral appliance of claim 1, said plurality of protuberances located on said external portion, or located on said internal portion, or located on both.

14. The oral appliance of claim 13, each of said plurality of protuberances varying in shape moving in the anterior direction.

15. The oral appliance of claim 1, further comprising stippling on said internal portion, or said external portion, or both of said internal portion and said external portion.

16. An oral appliance, comprising:

an external portion having:

a first body having a first channel shape formed of a first lingual wall extending between an anterior direction, a posterior direction and a first facial wall extending between said anterior direction and the posterior direction, and a first occlusal surface extending between said first lingual wall and said first facial wall;

a second body having a second channel shape formed of a second lingual wall extending between the anterior direction and the posterior direction and a second facial wall extending between the anterior direction and the posterior direction, and a second occlusal surface extending between said second lingual wall and said second facial wall;

a connector extending between said first body and said second body and having a lower elevation between ends of said connector;

a first lobe extending from an anterior end of said first facial wall and a second lobe extending from an anterior end of said second facial wall;

an internal portion having:

an internal support disposed within each of said first body and said second body, said internal support comprising first and second pluralities of protuberances which extend through respective said first and second lingual walls;

a connector support disposed within said connector, said connector support extending between said internal supports;

a stippling formed on a lower surface of said connector, or said connector support, or both.

17. The oral appliance of claim 16, said first lobe and said second lobe spaced from said first and second lingual walls and said connector.

* * * * *